US008271576B2

(12) United States Patent
Simone, Jr.

(10) Patent No.: US 8,271,576 B2
(45) Date of Patent: *Sep. 18, 2012

(54) METHOD AND APPARATUS FOR COMMUNICATING DURING AUTOMATED DATA PROCESSING

(75) Inventor: Kenneth D. Simone, Jr., Murphy, TX (US)

(73) Assignee: Corel Corporation, Ottawa (CA)

( * ) Notice: Subject to any disclaimer, the term of this patent is extended or adjusted under 35 U.S.C. 154(b) by 74 days.

This patent is subject to a terminal disclaimer.

(21) Appl. No.: 12/782,737

(22) Filed: May 19, 2010

(65) Prior Publication Data

US 2011/0126199 A1    May 26, 2011

Related U.S. Application Data

(63) Continuation of application No. 09/658,298, filed on Sep. 8, 2000, now Pat. No. 7,747,673.

(51) Int. Cl.
*G06F 15/16* (2006.01)
*G06F 12/00* (2006.01)
(52) U.S. Cl. ...................................................... 709/201
(58) Field of Classification Search .................. 709/201, 709/217–218, 225–229, 250; 718/102
See application file for complete search history.

(56) References Cited

U.S. PATENT DOCUMENTS

| | | |
|---|---|---|
| 4,860,375 A | 8/1989 | McCubbrey et al. |
| 4,937,763 A | 6/1990 | Mott |
| 5,173,853 A | 12/1992 | Kelly et al. |
| 5,179,651 A | 1/1993 | Taaffe et al. |
| 5,307,457 A | 4/1994 | Beitel et al. |
| 5,349,682 A | 9/1994 | Rosenberry |
| 5,353,391 A | 10/1994 | Cohen et al. |
| 5,386,568 A | 1/1995 | Wold et al. |
| 5,440,726 A | 8/1995 | Fuchs et al. |

(Continued)

FOREIGN PATENT DOCUMENTS

EP    0828214 A2    3/1998

(Continued)

OTHER PUBLICATIONS

Joeris, G. et al., "Towards Flexible and High-Level Modeling and Enacting of Processes", Proc. of the 11th Int. Conference, CAISE 1999, pp. 1-15.

(Continued)

*Primary Examiner* — Zarni Maung
(74) *Attorney, Agent, or Firm* — Mark J. Danielson; Pillsbury Winthrop Shaw Pittman LLP

(57) ABSTRACT

A number of items of data from a data source (12) can be processed and supplied to a data destination (16, 17). The data can include image data, text data, numeric data or other types of data, or a combination of these types of data. The processing of the data is controlled by a project definition (14, 71, 101), which includes a plurality of modules selected from a variety of available modules (Tables 1-4). The modules have input and output ports which are interrelated by binding information. Where a project definition is complex and/or is assigned to process a large data set, capability is provided to launch multiple instances of the same project definition, each of which processes a respective portion of the data. Further, capability is provided to launch multiple instances of the same or different project definitions on each of one or more computers, in order to efficiently execute project definitions in a centralized processing facility.

20 Claims, 10 Drawing Sheets

U.S. PATENT DOCUMENTS

| | | | |
|---|---|---|---|
| 5,481,668 | A | 1/1996 | Marcus |
| 5,515,496 | A | 5/1996 | Kaehler et al. |
| 5,525,335 | A | 6/1996 | Kitahara et al. |
| 5,535,335 | A | 7/1996 | Cox et al. |
| 5,570,126 | A | 10/1996 | Blahut et al. |
| 5,625,833 | A | 4/1997 | Levine et al. |
| 5,731,813 | A | 3/1998 | O'Rourke et al. |
| 5,734,837 | A | 3/1998 | Flores et al. |
| 5,748,884 | A | 5/1998 | Royce et al. |
| 5,765,176 | A | 6/1998 | Bloomberg |
| 5,848,198 | A | 12/1998 | Penn et al. |
| 5,848,393 | A | 12/1998 | Goodridge et al. |
| 5,907,837 | A | 5/1999 | Ferrel et al. |
| 5,911,776 | A | 6/1999 | Guck |
| 5,926,824 | A | 7/1999 | Hashimoto |
| 5,943,054 | A | 8/1999 | Hirano et al. |
| 5,974,431 | A | 10/1999 | Iida |
| 6,002,876 | A | 12/1999 | Davis et al. |
| 6,021,115 | A | 2/2000 | Simpson et al. |
| 6,055,549 | A | 4/2000 | Takano |
| 6,078,925 | A | 6/2000 | Anderson et al. |
| 6,083,277 | A | 7/2000 | Fowlow et al. |
| 6,130,676 | A | 10/2000 | Wise et al. |
| 6,202,070 | B1 | 3/2001 | Nguyen et al. |
| 6,225,998 | B1 | 5/2001 | Okita et al. |
| 6,226,322 | B1 | 5/2001 | Mukherjee et al. |
| 6,230,189 | B1 | 5/2001 | Sato et al. |
| 6,278,462 | B1 | 8/2001 | Weil et al. |
| 6,298,370 | B1 | 10/2001 | Tang et al. |
| 6,317,648 | B1 | 11/2001 | Sleep et al. |
| 6,333,752 | B1 | 12/2001 | Hasegawa et al. |
| 6,342,954 | B1 | 1/2002 | Hisatomi et al. |
| 6,347,374 | B1 | 2/2002 | Drake et al. |
| 6,362,836 | B1 | 3/2002 | Shaw et al. |
| 6,363,411 | B1 | 3/2002 | Duggan et al. |
| 6,370,575 | B1 | 4/2002 | Dougherty et al. |
| 6,374,353 | B1 | 4/2002 | Settsu et al. |
| 6,377,939 | B1 | 4/2002 | Young |
| 6,385,170 | B1 | 5/2002 | Chiu et al. |
| 6,386,451 | B1 | 5/2002 | Sehr |
| 6,396,488 | B1 | 5/2002 | Simmons et al. |
| 6,397,191 | B1 | 5/2002 | Notani et al. |
| 6,397,259 | B1 | 5/2002 | Lincke et al. |
| 6,398,259 | B1 | 6/2002 | Palmer et al. |
| 6,441,913 | B1 | 8/2002 | Anabuki et al. |
| 6,446,110 | B1 | 9/2002 | Lection et al. |
| 6,446,135 | B1 | 9/2002 | Koppolu et al. |
| 6,487,677 | B1 | 11/2002 | Jantz et al. |
| 6,489,971 | B1 | 12/2002 | Miller et al. |
| 6,493,870 | B1 | 12/2002 | Madany et al. |
| 6,532,218 | B1 | 3/2003 | Shaffer et al. |
| 6,542,912 | B2 | 4/2003 | Meltzer et al. |
| 6,557,164 | B1 | 4/2003 | Faustini |
| 6,560,633 | B1 | 5/2003 | Roberts et al. |
| 6,571,246 | B1 | 5/2003 | Anderson et al. |
| 6,581,094 | B1 | 6/2003 | Gao |
| 6,590,573 | B1 | 7/2003 | Geshwind |
| 6,591,272 | B1 | 7/2003 | Williams |
| 6,598,219 | B1 | 7/2003 | Lau |
| 6,601,108 | B1 | 7/2003 | Marmor |
| 6,622,168 | B1 | 9/2003 | Datta |
| 6,628,824 | B1 | 9/2003 | Belanger |
| 6,631,497 | B1 | 10/2003 | Jamshidi et al. |
| 6,634,008 | B1 | 10/2003 | Dole |
| 6,643,843 | B1 | 11/2003 | Reger |
| 6,650,779 | B2 | 11/2003 | Vachtesvanos et al. |
| 6,651,121 | B1 | 11/2003 | Zurawski et al. |
| 6,654,795 | B1 | 11/2003 | Coile |
| 6,662,355 | B1 | 12/2003 | Caswell et al. |
| 6,674,472 | B1 | 1/2004 | Tsutsui |
| 6,750,890 | B1 | 6/2004 | Sugimoto |
| 6,757,888 | B1 | 6/2004 | Knutson et al. |
| 6,850,956 | B1 | 2/2005 | Knutson |
| 6,868,193 | B1 | 3/2005 | Gharbia et al. |
| 6,925,593 | B1 | 8/2005 | Knutson et al. |
| 6,938,030 | B1 | 8/2005 | Simone et al. |
| 6,944,865 | B1 | 9/2005 | Zurawski et al. |
| 6,961,922 | B1 | 11/2005 | Knutson |
| 7,000,223 | B1 * | 2/2006 | Knutson et al. ............... 717/121 |
| 7,296,238 | B1 * | 11/2007 | Zurawski ...................... 715/763 |
| 7,747,673 | B1 * | 6/2010 | Simone, Jr. ................... 709/201 |
| 7,853,833 | B1 * | 12/2010 | Gharbia et al. ............. 714/47.1 |
| 7,962,618 | B2 * | 6/2011 | Knutson et al. ............... 709/225 |
| 2001/0011241 | A1 | 8/2001 | Nemzow |
| 2002/0169789 | A1 | 11/2002 | Kutay et al. |

FOREIGN PATENT DOCUMENTS

| | | |
|---|---|---|
| WO | 00/38033 A2 | 6/2000 |
| WO | 01/60060 A2 | 8/2001 |
| WO | WO 02-21319 | 3/2002 |

OTHER PUBLICATIONS

Conger, "Emergence of Workflow Management in Enterprise-Class Business Solutions",SunWorld,1999 http://sunsite.uakom.sk/sunworldonline/swol-09-1999/swol-09-itarchitect_p.html.

International Search Report in Int'l Application No. PCT/US01/28290, dated Apr. 10, 2003.

Microsoft Corporation, "Microsoft Word: User's Guide" 1993-1994, Microsoft Press, Version 6.0.

Microsoft Corporation, "Microsoft Word User's Guide" 1993, Cover Page, 1 unnumbered page, pp. 590-591.

Dabke et al, "Netbuilder: An Environment for Integrating Tools and People", Computer Aided Design, vol. 30, No. 6, 1998, pp. 465-472.

Hollingsworth, "Workflow Management Coalition—The Workflow Reference Model, Document No. TC00-1003, Release 1.1", Workflow Management Coalition, Jan. 19, 1995, pp. 1-55.

Georgakopulos et al "An Overview of Workflow Management: From Process Modelling to Workflow Automation Infrastructure", XP-001055255, Distributed and Parallel Databases, Apr. 1995, 35 pages.

PCT Interrnational Preliminary Examination Report, International Application No. PCT/US01/28270, Jan. 27, 2004, 27 pages.

Jupitermedia Corporation, "OnSwitch—XML Based Automated Web Image Processing", Datamation(TM) Product Watch Sheet No. 966003140, XP002235801, Aug. 11, 2000, 2 pages.

PCT Interrnational Preliminary Examination Report, International Application No. PCT/US01/28226, May 3, 2002, 6 pages.

Previato et al, "Nile's Distributed Computing Site Architecture", XP-002231439, University of Texas at Austin, Feb. 17, 1997, 4 pages.

Image2Web Launches On-Switch—First of its kind Internet Image and Data Infrastructure Solution, Business Wire, San Francisco, California, Aug. 10, 2000, 2 unnumbered pages.

PCT International Search Report, International Application No. PCT/US01/028230, Apr. 10, 2003, 7 pages.

PCT international Preliminary Examination Report, International Application No. PCT/US01.28270, Jan. 27, 2004, 27 pages.

"User Guide—Adobe Photoshop 5.0", Adobe Systems Inc., San Jose, California, 1998, 2 title pages and pp. 13-22, 301-308, 347-358.

* cited by examiner

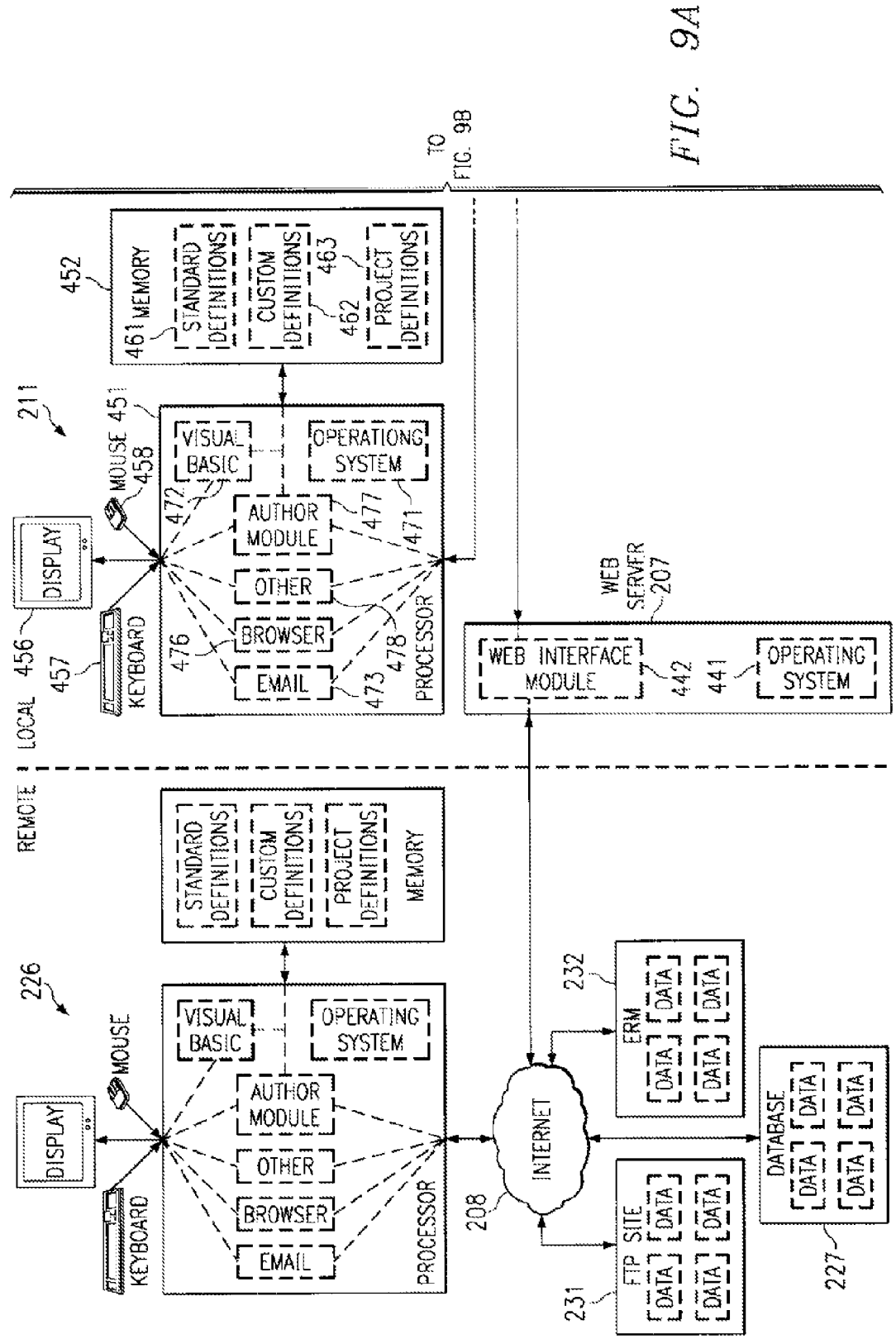

METHOD AND APPARATUS FOR COMMUNICATING DURING AUTOMATED DATA PROCESSING

CROSS REFERENCE TO RELATED APPLICATIONS

This application is a Continuation of U.S. application Ser. No. 09/658,298, filed Sep. 8, 2000 entitled "Method and Apparatus for of Communicating During Automated Data Processing", now U.S. Pat. No. 7,747,673.

FIELD OF THE INVENTION

The invention relates in general to automated processing of multiple items of data and, more particularly, to a method and apparatus for enhancing reliability of such automated data processing.

BACKGROUND OF THE INVENTION

There are a variety of situations in which automated processing of a number of data items is desirable. One specific example of such an application is product catalogs. Product catalogs, whether in the form of a paper catalog or an Internet "Web" site, frequently have numerous pictures which each depict a respective one of the various items that are available for sale. Many years ago, these pictures were prepared using optical negatives and photographs. Currently, however, the trend is to maintain and process these pictures in the form of computer files containing digital images.

A given paper or on-line catalog will usually include products from a variety of different manufacturers, and it is common for each manufacturer to provide its own digital images. There will typically be variation between the form of images provided by different manufacturers, for example in terms of characteristics such as the size, shape, resolution, tint, and so forth. It is even possible that the images from a single given manufacturer may have different forms. Accordingly, in order for the images throughout a catalog to have a generally similar appearance, the various images from various sources need to be processed to adjust characteristics such as size, shape, resolution, and/or tint, so as to bring them into general conformity with each other.

A further consideration is that a manufacturer's images do not represent a static situation, because manufacturers are constantly adding new products with new images, discontinuing existing products and associated images, and providing updated images for existing products. Moreover, there may be other reasons for adjusting images. For example, with respect to a paper or on-line catalog intended for use during the Christmas season, there may be a desire to put a festive frame around each image, such as a frame of holly leaves and berries. Moreover, stylistic changes in the images are often desirable.

The traditional approach for carrying out these various types of image processing tasks has involved manual adjustments effected on an image-by-image basis, through use of image processing software requiring extensive operator interaction. However, this is extremely time consuming and expensive. Many organizations currently employ a number of graphic artists to do this work, at great expense.

A less common approach has been the preparation of a hard-coded software routine to process images, written in line-by-line source code. However, these routines are time-consuming and expensive to generate, are likely to include errors or "bugs", and have little flexibility because they cannot be modified quickly and cheaply. Moreover, they can only be prepared and executed by a skilled programmer, rather than by a graphic artist who is skilled in image processing but has limited computer skills. It is difficult to find persons who have both artistic and computer skills, and they command large salaries.

Thus, while these traditional approaches have been generally adequate for their intended purposes, they have not been satisfactory in all respects. In this regard, a further consideration is that, to optimize efficiency, a computer program which effects automated processing of multiple items of data may be executed for a relatively long period of time, for example several weeks or several months. Computer programs may contain subtle bugs which do not present significant problems where the program is restarted rather frequently, for example on a daily basis, but which can produce relatively significant problems where the program is executed continuously over a long period of time. The problems which result can manifest themselves in various ways, ranging from operational characteristics that become progressively less efficient, to a complete "crash" of the software in which no meaningful processing takes place.

SUMMARY OF THE INVENTION

It is an object of the present invention to obviate or mitigate at least one disadvantage of the prior art.

From the foregoing, it may be appreciated that a need has arisen for a method and apparatus for automated processing of data, which enhances reliability of the automated processing and its results, especially in situations where the program which performs the processing is executed continuously over a relatively long period of time. According to the present invention, a method and apparatus are provided to address this need.

In particular, one form of the present invention involves: executing in a computer system a first procedure which effects execution of a series of project definitions, wherein each such project definition obtains data from a data source, processes the data in a specified manner, and then places the data in a data destination; and executing in the computer system a second procedure which monitors the execution of the first procedure for a condition, and which takes remedial action in response to detection of the condition.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Figure 1:
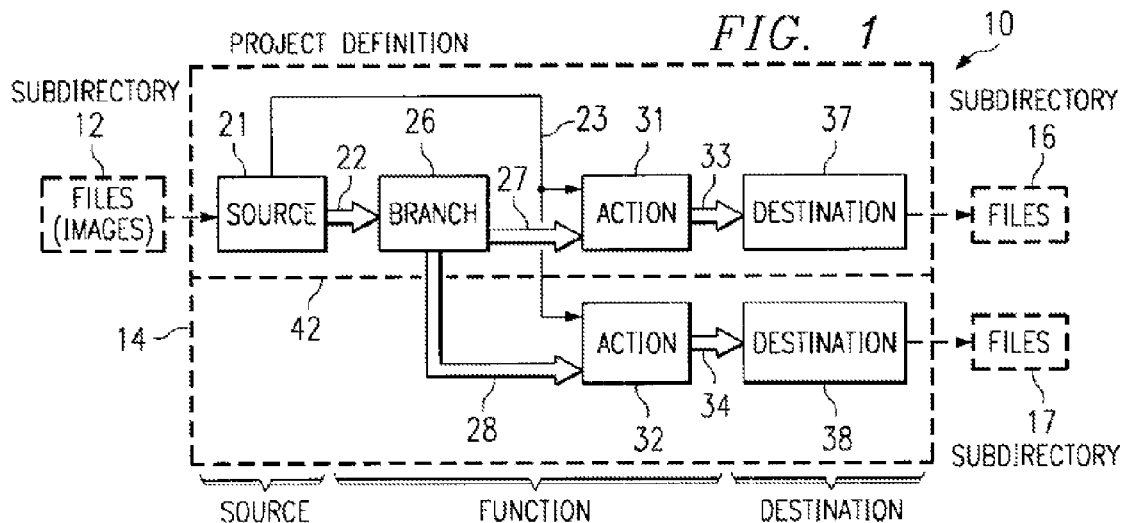
FIG. 1 is a diagrammatic view of a configuration which embodies the present invention, and which includes a data source, two data destinations, and a project definition.
Figure 2:
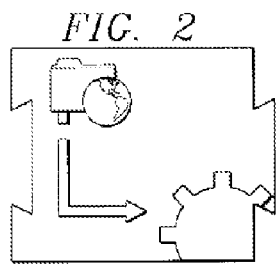
FIGS. 2-5 are each a diagrammatic view of a respective different icon which can be used to diagrammatically represent a portion of a project definition of the type shown in FIG. 1.
Figure 3:
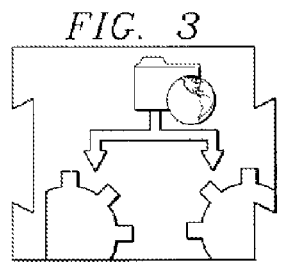
Figure 4:
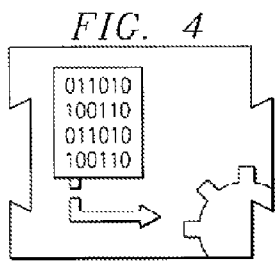
Figure 5:
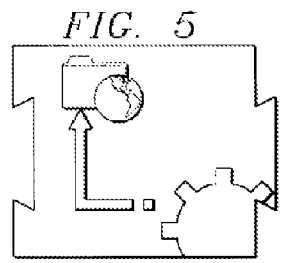

FIG. 1 is a block diagram of a configuration 10 which embodies features of the present invention, and which includes a computer subdirectory 12 that serves as a data source and contains a plurality of files with images therein, a project definition 14 that defines how data from the files in the subdirectory 12 should be processed, and two computer subdirectories 16 and 17 that serve as data destinations into which files containing the processed data will be stored. The project definition 14 is executed by a computer, in a manner described in more detail later, and successively obtains the files from the subdirectory 12, processes each file 12 in a manner described below, and then deposits the processed file in either the subdirectory 16 or the subdirectory 17. For purposes of the present discussion, it is assumed that the files in the subdirectory 12 contain image data, but they could alternatively contain some other type of data. Also, the terms directory, subdirectory, folder and subfolder are all used here to refer to directories.

The specific project definition 14 shown in FIG. 1 has been designed to be relatively simple for purposes of illustrating some basic concepts of the present invention, and basically will do two things. First, it will take each file obtained from the subdirectory 12, and evaluate the size of the file. With respect to size, it is important to remember the distinction between the size of an image, which is measured in pixels in each of the height and width directions, and the size of the file containing the image, which is typically measured in kilobytes (KB). In FIG. 1, files above a certain size are to be placed in the subdirectory 16 after processing, whereas all other files are to be placed in the subdirectory 17 after processing. Second, the project definition 14 will take the name of each file, and superimpose this name on top of the image in the file. For example, if a given file is named "elephant" and contains an image of an elephant, the word "elephant" will be superimposed on top of the image of the elephant.

The subdirectory 12 is not itself a part of the project definition 14. Subdirectory 12 may be local to the computer executing the project definition 14, may be disposed in another nearby computer accessible through a local area network (LAN), may be disposed in a remote computer many miles away which must be accessed through the Internet, or may be accessed in some other manner. The project definition 14 thus needs to know where to find the subdirectory 12 and the data therein. Accordingly, the project definition 14 includes a source module 21, which includes a definition of where to locate the subdirectory 12, and how to access it. The source module 21 successively obtains the files from the subdirectory 12. Each time the source module 21 receives a file from the subdirectory 12, it outputs the image data from the file through a first output port, as indicated diagrammatically at 22, and outputs a text string representing the file name through a second output port, as indicated diagrammatically at 23.

Lines of the type shown at 22 and 23 are referred to herein as binding lines. For convenience, image data is indicated by a wide double-line binding line, as shown in 22, whereas other types of data are indicated by a thin single-line binding line, as shown at 23. Alternatively, different types of binding lines could be distinguished in some other manner, for example by presenting them in different colors. Where an input port and an output port are associated with each other by a binding line, they are said to be bound to each other.

In the embodiments disclosed herein, an image or other data element obtained from a data source by a project definition is processed to completion by the project definition before the next successive image or data item from that data source is provided to the project definition. However, it will be recognized that it would alternatively be possible for a project definition to simultaneously have several successive images or data elements at various levels of processing, for example through the use of appropriate pipelining techniques. Conceptually, one way to view the project definition 14 of FIG. 1 is that execution proceeds on a module-by-module basis through the project definition along the double-line image data binding lines, from the source module 21 to the branch module 26, and then to either the action module 31 followed by the destination module 37, or alternatively to the action module 32 followed by the destination module 38. Another way to view the project definition 14 is that each of the modules is ready at all times to carry out its respective function, and does so as soon as all data needed to carry out that function arrives at the input port(s) of that module.

Image data that is output at 22 by the source module 21 flows to an input port of a branch module 26. The branch module 26 checks the size of the file associated with each image that arrives at its input port. If the file size for a given image is above a predetermined size, then the branch module 26 outputs the image data at 27 through a first output port. Otherwise, it outputs the image data at 28 through a second output port. The image data at 27 flows to an input port of an action module 31, whereas the image data at 28 flows to an input port of an action module 32.

For the sake of simplicity, the action modules 31 and 32 in the example of FIG. 1 have identical functions. More specifically, each has a further input port which receives the text string represented by binding line 23. As mentioned above, this text string contains the name of the file associated with the image data. The action modules 31 and 32 each have the capability to take the text string and superimpose it on the associated image data, and then output the result at 33 or 34 through an output port. The data at 33 flows to an input port of a destination module 37, and data at 38 flows to an input port of a destination module 38. Again, for simplicity, 40 destination modules 37 and 38 are functionally identical.

In this regard, and as was the case with the subdirectory 12, the subdirectories 16 and 17 may each be local or remote, and may be accessed in different ways. Further, one or both of the subdirectories 16 and 17 may be located in proximity to the subdirectory 12, or may be remote from the subdirectory 12. Consequently, since the subdirectories 16 and 17 are not part of the project definition 14, the project definition 14 needs to know where to find them and how to access them, so that it knows where to deposit processed data. Accordingly, the destination modules 37 and 38 each include a definition of where to find the associated subdirectory 16 or 17, and how to access it. Thus, when the project definition 14 has finished processing all of the files from the subdirectory 12, the subdirectory 16 will contain a processed version of the files which are larger than a specified size, and the subdirectory 17 will contain a processed version of the remaining files. Further, each of the files in subdirectories 16 and 17 will contain an image which has the associated file name superimposed on it.

A brief comment regarding the use of the terms "process" and "sub-process" will help to avoid confusion. A project definition of the general type shown at 14 in FIG. 1 may include two or more mutually exclusive sets of modules, which are each referred to as a process. In the particular example of FIG. 1, for the sake of simplicity, the project definition 14 includes only one process, which contains all of the modules 21, 26, 31-32, and 37-38. This process has two portions, which are respectively disposed above and below the broken line 42 in FIG. 1.

The modules 21, 23, 31 and 37 which are above the broken line 42 are referred to herein as a main process, and the modules 32 and 38 which are below the broken line 42 are referred to as a sub-process. Technically, the main process and the sub-process are each a respective subprocess of the overall process. However, the first subprocess in every process is mandatory, and is always the starting point for execution of the process, and thus it is referred to as the main "process" rather than as the main "sub-process", even though it is actually a sub-process of the overall process. The presence of one or more additional sub-processes is entirely optional, and execution may or may not be transferred to each, depending upon factors such as whether branch modules are present and the particular data which is being processed. Consequently, they are referred to as sub-processes. An input or output port of a given module can be bound to ports of other modules within any of the sub-processes of the same process, but cannot be directly bound to ports of modules in other processes of the same project definition.

Where a branch module in a main process is capable of routing data to a sub-process, the data is always transferred to the first module in that sub-process, rather than to an intermediate module partway along the sub-process. The same is true where a branch module in a sub-process is capable of transferring data to a different sub-process. A further characteristic in the disclosed embodiments is that branch modules are allowed to route data to a later subprocess, but never to an earlier sub-process or the main process. Moreover, while one output port of a branch module can route data to the next successive module in the current sub-process (which may be the main process), the other output port is not permitted to route data to a module in the current sub-process, but must route data to a different sub-process. However, it will be recognized that an alternative embodiment could accommodate branch modules having the capability to route data to an earlier sub-process (which may be the main process), to a module partway along a different sub-process (which may be the main process), or to two modules which are both within the current subprocess. In fact, the alternative embodiment need not conceptually organize modules of an overall process into groups treated as respective sub-processes.

As discussed above, the branch module 26 will route each image either at 27 to the action module 31 or at 28 to the action module 32. If the data is routed to action module 31, then action module 31 and destination module 32 operate on the image data, while action module 32 and destination module 38 remain idle. Alternatively, if an image were instead to be routed at 28 to the action module 32, then action module 32 and destination module 38 would operate on the image data, while action module 31 and 30 destination module 37 remained idle. Thus, in the example of FIG. 1, the branch module 26 determines whether processing of each image will be carried out by continuing along the main process, namely in action module 31 and destination module 37, or will be carried out in the sub-process, namely in action module 32 and destination module 38.

The project definition 14 in FIG. 1 is a simple example, but has been configured to show at least one example of each of the four types of modules that are recognized in the disclosed embodiments of the present invention. In other words, the disclosed embodiments of the present invention recognize source modules, one example of which appears at 21, branch modules, one example of which appears at 26, action modules, two examples of which appear at 31 and 32, and destination modules, two examples of which appear at 37 and 38. As reflected by the brackets along the bottom of FIG. 1, branch modules and action modules are sometimes referred to collectively herein as function modules. Source modules deal with the question of where to find the data to be processed, branch modules deal with the question of which data should and should not be processed in a specified manner, action modules deal with the question of what processing should be performed on the data, and destination modules deal with the question of where to put the processed data.

In order to put the present invention into perspective, it is helpful to understand one possible application for a project definition of the type shown at 14 in FIG. 1. Product catalogs, whether in the form of a paper catalog or an Internet "Web" site, frequently have numerous pictures each depicting a respective one of the various items that are available for sale. Many years ago, these pictures were prepared using optical negatives and photographs. Currently, however, the trend is to maintain and process these pictures in the form of computer files containing digital images.

A given paper or on-line catalog will usually include products from a variety of different manufacturers, and it is common for each manufacturer to provide its own digital images. There will typically be variation between the form of images provided by different manufacturers, for example in terms of characteristics such as the size, shape, resolution, tint, and so forth. It is even possible that the images from a given manufacturer may have different forms. Accordingly, in order for the images throughout a catalog to have a generally similar appearance, the various images from various sources need to be processed to adjust characteristics such as size, shape, resolution, and/or tint, so as to bring them into general conformity with each other. A further consideration is that a manufacturer's images do not represent a static situation, because manufacturers are constantly adding new products with new images, discontinuing existing products and their images, and providing updated images for existing products. Moreover, there may be other reasons for adjusting images. For example, with respect to a paper or on-line catalog intended for use during the Christmas season, there may be a desire to put a festive frame around each image, such as a frame of holly leaves and berries. Moreover, stylistic changes in the images are often desirable.

The traditional approach for carrying out these various types of image processing tasks has involved manual adjustments effected on an image-by-image basis, through use of image processing software requiring extensive operator interaction. However, this is extremely time consuming and expensive. Many organizations employ a number of graphic artists to do this work, at great expense.

A less common approach has been preparation of a hard-coded software routine to process images, written in line-by-line source code. However, these routines are time-consuming and expensive to generate, are likely to include errors or "bugs", and have little flexibility because they cannot be modified quickly and cheaply. Moreover, they can only be prepared and executed by a skilled programmer, rather than by a graphic artist who is skilled in image processing but has limited computer skills. It is difficult to find persons who have both artistic and computer skills, and they command large salaries.

In contrast to these known approaches, a project definition of the type shown at 14 in FIG. 1 provides the capability to automate image processing so that a large number of images can be automatically and rapidly processed in a defined manner, and at far less expense than would be involved with the traditional and common approach of manual processing. Further, and as described in more detail later, the present invention provides a simple and user-friendly approach for creating and modifying project definitions of the type shown at 14 in FIG. 1, thereby permitting graphic artists who have limited computer skills to easily and accurately create a project definition while substantially avoiding the likelihood of bugs, with far less overall time and expense than is involved with the known approaches discussed above. The advantages of the present invention over the known approaches will become even more apparent as the present invention is discussed in greater detail below. While the foregoing example of catalog preparation focused on processing of image data, and while the disclosed embodiments involve primarily the processing of image data, the present invention is also advantageous for applications which involve processing of other types of data.

The foregoing discussion of FIG. 1 described one specific example of each of the source, branch, action and destination categories of modules. The present invention actually recognizes several types of modules in each category. More specifically, TABLE 1 describes several different types of source modules, TABLE 2 describes several different types of branch modules, TABLE 3 describes several different types of action modules, and TABLE 4 describes several different types of destination modules. Some of the module types set forth in TABLES 1-4 could be omitted, or additional module types could be included, without departing from the present invention. The module types set forth in TABLES 1-4 are referred to herein as standard module types. As discussed later, the present invention also provides for the creation of custom module types, for example through modification of one of the standard module types set forth in TABLEs 1-4. The resulting custom module type can either be substituted for the standard module type from which it was derived, using the same name, or can be used to supplement the standard module types, using a unique new name.

A few comments are appropriate regarding TABLEs 1-4. First, the present invention permits the use of virtual paths, where a table is provided to associate each virtual path with an actual path. Where a project definition uses a virtual path term, each computer on which that project definition may be executed would include a respective table entry to associate that virtual path with a respective actual path. Thus, the project definition can be executed without change on each such computer, but will use a different actual path on each computer wherever the virtual path term appears, without any need to actually modify the path information within the project definition itself.

A further consideration is that, in the disclosed embodiments, project definitions recognize various types of data, including image data, numeric data in a floating point or "float" format, and string data in the form of a series of text characters. In the discussion which follows, references to data types are typically p preceded by the prefix "em", such as "emImage", "emFloat", or "emString". This is an arbitrary prefix, which has been used to facilitate implementation of the disclosed embodiments. For example, if data is received from an external source with an indication that it includes data of a type "emFloat", it can be assumed that it conforms to the appropriate format. In contrast, if the data type is merely indicated to be "float", it would be necessary to evaluate the associated data in an attempt to determine which of various formats for floating point data it conforms to, but even then it may not be possible to tell.

A feature of the present invention is that many of the module definitions in Tables 2 through 4 have input ports configured so that the input port will accept data in various formats and, if that data is not in the format preferred by that input port, the input port will automatically convert the data to its preferred format. This feature is referred to as data matching. For example, if a number in a floating point format is supplied to an input port which expects data in a string format, the floating point value will be converted to a text string which represents the number. Input ports which have this capability are identified in TABLES 1-4 as having a data type of "emVariant". This does not mean that actual data can be formatted in the "emVariant" format. Instead, "emVariant" refers only to the capability of the input port to be bound to an output port that produces data conforming to other valid data types, such as "emFloat" or "emString".

With respect to image data, it should be understood that data for a given image may include two or more objects and/or layers. For example, an image may have two layers which are each an object. Similarly, if a mask is created for an image, the mask will be added to the image data in the form of a separate layer. Also, if text is superimposed onto an image, for example as discussed above in association with the action modules 31-32 in FIG. 1, the text will be added as an object, separate from other pre-existing objects of the image data. All the objects associated with a given image can be combined into a single object, through use of a "Flatten Image" definition which is set forth in TABLE 3.

In general, the definitions of source, branching, action and destination modules in Tables 1-4 are believed to be self-explanatory. However, there is one definition as to which a supplementary comment may be helpful. In this regard, the "Database Access" definition in TABLE 1 is a source module which obtains data in a manner that includes 40 accessing a database. The database will include a table that has a plurality of rows called records, which each include a plurality of columns called fields. If the data being retrieved is string data, it may be retrieved directly from one of the fields in the table of the database. On the other hand, if the data being retrieved includes image data, the image data will typically be stored separately from the database, for example within files in a subdirectory, and one field in the table must contain a string with a complete path to the image data.

TABLES 1

| SOURCE DEFINITIONS | | | |
|---|---|---|---|
| Variable Name | Port | Type | Description |
| DATABASE ACCESS | | | |
| Uses a database table or query to identify data to process. Unless processing strings, one field in the table must contain a string with a complete path to the image data. May optionally select one or more additional fields that will be output separately (for binding by subsequent functions). The database table or query must already exist and be defined as an ODBC (Open DataBase Connectivity) connection prior to using this function. | | | |
| Image Out | Output | emImage | Image data |
| Specified Field | Output | emString | Each selected field is converted to string output, and retains field name |
| FILE BROWSER | | | |
| Adds one file at a time to a list of images to process. The resulting list is saved, and is subsequently used during execution to automatically retrieve the specified images in sequence. | | | |
| ImageOut | Output | emImage | Image data |
| INTERNET FILES | | | |
| Collects all of the image files from a specified URL (Universal Resource Locator) address. Optionally, the function will continue to other pages to which the specified site is linked (from one to five levels, as specified by the Depth setting). By default, it only follows links within the same domain name, but this can optionally be disabled. | | | |
| ImageOut | Output | emImage | Image data |
| LOCAL FILES | | | |
| Indicates a folder or a virtual path to where images to be processed are stored. Can select whether or not subfolders (subdirectories) of the indicated folder will be accessed. | | | |
| ImageOut | Output | emImage | Image data |
| AltText | Output | emString | Alternate text of the image on that page |

TABLE 2

| BRANCHING DEFINITIONS | | | |
|---|---|---|---|
| Variable Name | Port | Type | Description |
| ALWAYS JUMP | | | |
| Unconditionally forces execution from the current process to the start of a specified sub-process. | | | |
| ImageIn | Input | emImage | Image data |
| ImageOut | Output | emImage | Image data |
| COLOR TYPE | | | |
| Restricts the processing of images in the current process to only those color types specified. The default setting is that all color types are processed. For non-qualifying images, execution can optionally be diverted to a sub-process. | | | |
| ImageIn | Input | emImage | Image data |
| ImageOut1 | Output | emImage | Image data (current process) |
| ImageOut2 | Output | emImage | Image data (sub-process) |
| FILE FORMAT | | | |
| Restricts processing of image files in the current process to only those file types specified. The default setting is that all image file types are processed. For non-qualifying images, execution can optionally be diverted to a sub-process. | | | |
| ImageIn | Input | emImage | Image data |
| ImageOut1 | Output | emImage | Image data (current process) |
| ImageOut2 | Output | emImage | Image data (sub-process) |
| FILE SIZE | | | |
| Restricts the processing of images in the current process to only those files that fall within a specified file size range. An upper limit and/or a lower limit may be set. The default setting is that all file sizes are processed. For non-qualifying images, execution can optionally be diverted to a subprocess | | | |
| ImageIn | Input | emImage | Image data |
| ImageOut1 | Output | emImage | Image data (current process) |
| ImageOut2 | Output | emImage | Image data (sub-process) |
| INTERACTIVE | | | |
| Pauses execution and causes display of a dialog box which prompts a person for a decision on which branch to take, if any. Allows a default directive to be defined (which may be to continue the current process, branch to a sub-process, or terminate all execution). As each image is processed, the list of available options is presented, with the default being applied if an "OK" option is selected. Selecting a "Don't show me this again" checkbox causes the currently selected option to be automatically applied to each subsequent image without interaction. For non-qualifying images, execution can optionally be diverted to a sub-process. | | | |
| ImageIn | Input | emImage | Image data |
| ImageOut1 | Output | emImage | Image data (current process) |
| ImageOut2 | Output | emImage | Image data (sub-process) |
| STRING FILTER | | | |
| Restricts the processing of images in the current process to only those files that include or exclude (as specified) one or more specific string values. The condition is met if any of the specified strings match any part of string data in the image. Matching is not case sensitive. For non-qualifying images, execution can optionally be diverted to a sub-process. | | | |
| ImageIn | Input | emImage | Image data |
| ImageOut1 | Output | emImage | Image data (current process) |
| ImageOut2 | Output | emImage | Image data (sub-process) |
| Source | Input | emString | Source of the string input |
| WIDTH/HEIGHT | | | |
| Restricts processing of images in the current process to only those images that fall with specified height and/or width parameters (as measured in pixels). The default setting is that there are no restrictions. To set a range having an upper and lower limit, use two successive Width Height functions. For non-qualifying images, execution can optionally be diverted to a subprocess. | | | |
| ImageIn | Input | emImage | Image data |
| ImageOut1 | Output | emImage | Image data (current process) |
| ImageOut2 | Output | emImage | Image data (sub-process) |
| WILD CARD | | | |
| Specifies the images to include or exclude from processing in the current process, based on the file name. Standard wildcards may be used to define the condition, including a question mark (?) to represent any single character, and/or an asterisk (*) to represent one or more characters. For non-qualifying images, execution can optionally be diverted to a subprocess. | | | |
| ImageIn | Input | emImage | Image data |
| ImageOut1 | Output | emImage | Image data (current process) |
| ImageOut2 | Output | emImage | Image data (sub-process) |

TABLE 3

ACTION DEFINITIONS

| Variable Name | Port | Type | Description |
| --- | --- | --- | --- |
| \multicolumn{4}{c}{AUTO SELECT} | | | |

AUTO SELECT

Attempts to mask the background (or foreground) of an image. It looks at eight points (the four image corners, and the center of each side). If three or more points have substantially the same color, it is assumed to be the background color. The resulting mask corresponds to points throughout the image that match the background color, within a "Tolerance" setting. Small matching patches within the non-background portion may be ignored by enabling a "Remove Holes" option. Successful mask creation causes execution to continue in the current process. Otherwise, execution can optionally continue for the image in a sub-process.

| Variable Name | Port | Type | Description |
| --- | --- | --- | --- |
| ImageIn | Input | emImage | Image data |
| ImageOut1 | Output | emImage | Image data (current process) |
| ImageOut2 | Output | emImage | Image data (sub-process) |

BEVELER

Produces a three-dimensional effect by adjusting the border of the image so that it appears to be bevelled. In addition, it allows setting the apparent direction of a light source to produce a shadow effect in regard to the bevel. Parameters include: the percentage of the image to be bevelled; the smoothness of the edge of the bevel; the intensity of the light effect overall; the intensity of the light effect along the bevel edge closest to the light source; and the apparent depth of the bevel. A sample image is displayed to show an example of the effect that the current parameters will have on an image

| Variable Name | Port | Type | Description |
| --- | --- | --- | --- |
| ImageIn | Input | emImage | Image data |
| ImageOut | Output | emImage | Image data (current process) |

BLUR IMAGE

Blurs a specified image or image object to a selected degree, using a selected one of a "General Blur" or "Gaussian Blur" technique. The "General Blur" may be configured to blur only hard edges, soft edges, or both. A "Lightness" setting can be enabled to smooth the image without affecting the colors. The "Gaussian Blur" has less versatility, but can have a much more pronounced blur effect. A sample image is displayed to show how the current setting would affect an image.

| Variable Name | Port | Type | Description |
| --- | --- | --- | --- |
| ImageIn | Input | emImage | Image data |
| ImageOut | Output | emImage | Image data (current process) |

CALCULATED EXPAND

Expands the shortest side of the image to match the longest side of the image. The resulting image will be square, with the original image centered in it. The added area will be filled with a specified color.

| Variable Name | Port | Type | Description |
| --- | --- | --- | --- |
| ImageIn | Input | emImage | Image data |
| ImageOut | Output | emImage | Image data (current process) |

CALCULATOR

Image data passes through this function unchanged. This function performs one or more mathematical computations defined by specified equations, and outputs the results. Before being converted to a string, output is in the form of a floating point format unless a "Fix" or "Int" option is selected. "Fix" rounds a negative number up to the nearest whole number, while "Int" rounds a negative number down. Both treat positive numbers the same, by rounding down to the nearest whole number. Equations may be entered manually in an equation workspace, or by clicking calculator controls. Variables can be statically defined at design time, dynamically obtained at input ports, or both. Integers and numeric strings from input ports are automatically converted to floating point values. There are eight temporary variables which can store the value of an interim computation for use in a subsequent equation. It is possible to perform a conditional statement that effects branching, where execution for each image continues in either the current process or a sub-process, depending on the condition.

| Variable Name | Port | Type | Description |
| --- | --- | --- | --- |
| ImageIn | Input | emImage | Image data |
| ImageOut1 | Output | emImage | Image data (current process) |
| ImageOut2 | Output | emImage | Image data (sub-process) |
| InVal1(2, . . . 8) | Input | emFloat | Any integer, floating point or numeric string value |
| OutVal1(2, . . . 8) | Output | emString | Calculated value |
| Temp1(2, . . . 8) | — | emFloat | Used internally for temporary storage |

CROP

Trims away undesired portions of an image. The "Specified Size" method indicates in pixels how much of the image should remain after processing. The "Specified Border" method indicates how much of one or more borders are to be trimmed away.

| Variable Name | Port | Type | Description |
| --- | --- | --- | --- |
| ImageIn | Input | emImage | Image data |
| ImageOut | Output | emImage | Image data |

CROP TO MASK

Trims an image to a predefined mask, such as may exist for certain TIF images. There are no user defined parameters.

| Variable Name | Port | Type | Description |
| --- | --- | --- | --- |
| ImageIn | Input | emImage | Image data |
| ImageOut | Output | emImage | Image data |

DROP SHADOW

Adds a shadow effect behind the last active object. The object may be the image, a mask, or an effect that was added, such as text from the Text Stamper function. The shadow size, offset from object, and color may be set, as well as the color of the page background. Also, control is permitted for the percentage of transparency, as well as the number of pixels in the feather. The feather length in pixels controls how abruptly the drop shadow transitions from the page backdrop color to the color of the drop shadow, thereby producing a smoothing effect. If Drop Shadow is applied to a mask object, the mask object is deleted and the added shadow becomes the active object.

| Variable Name | Port | Type | Description |
| --- | --- | --- | --- |
| ImageIn | Input | emImage | Image data |
| ImageOut | Output | emImage | Image data |

EXPAND

Enlarges an image. The "Specified Border" method adds a specified number of pixels to one or more sides of an image. The "Specified Size" method specifies the total size of the image in pixels. The color of the added area is set to a specified color, the default being white.

| Variable Name | Port | Type | Description |
| --- | --- | --- | --- |
| ImageIn | Input | emImage | Image data |
| ImageOut | Output | emImage | Image data |

EXTERNAL ACTION

Cooperates with a separate image processing application (such as the application commercially available under the tradename Photoshop from Adobe Systems Incorporated of San Jose, California). Opens the image in the application, performs a specified command in that application, and then returns the processed image from that application. Only commands that do not prompt the user for input may be used.

| Variable Name | Port | Type | Description |
| --- | --- | --- | --- |
| ImageIn | Input | emImage | Image data |
| ImageOut | Output | emImage | Image data |

FEATHER MASK

Produces a transitional feathering effect between the mask and the image. Which way the feathering occurs depends on a "Direction" setting. Feathering directions may be "Inside", "Outside", or "Center", from the perspective of the mask. The "Edge" setting for the mask determines how abrupt a transition is made, and may be "Normal", "Hard", or "Soft". The "Amount" of feathering is measured by the length in pixels needed to make the transition. The larger the "Amount", the smoother the transition.

| Variable Name | Port | Type | Description |
| --- | --- | --- | --- |
| ImageIn | Input | emImage | Image data |
| ImageOut | Output | emImage | Image data |

FILE PATH INFO

Image data passes through this function unchanged. This function supplies several output ports with information derived from path information associated with the image.

| Variable Name | Port | Type | Description |
| --- | --- | --- | --- |
| ImageIn | Input | emImage | Image data |
| ImageOut | Output | emImage | Image data |
| DriveOrMachine | Output | emString | The path information up to the first single backslash |
| WholePath | Output | emString | Path information after the first backslash to before the last backslash |

TABLE 3-continued

ACTION DEFINITIONS

| Variable Name | Port | Type | Description |
|---|---|---|---|
| PathLevel1(2, ...) | Output | emString | A respective path level name, each of which is information from between two single backslashes |
| Filename | Output | emString | Filename without the extension |
| Extension | Output | emString | File name extension |

FILL
Fills the active object with a selected color.

| ImageIn | Input | emImage | Image data |
| ImageOut | Output | emImage | Image data |

FLATTEN IMAGE
Combines multiple objects into one image. An image mask is one example of a separate object or layer. Separate objects or layers are also created by functions such as Text Stamper, Image Stamper, Drop Shadow, and Image Watermarking. Unless multiple objects are flattened together, certain subsequent functions affect only the last active object rather than all objects. For example, if no Flatten Image function is used, a Drop Shadow function applied after a Text Stamper function will apply the shadow only to the stamped text, and not to the image.

| ImageIn | Input | emImage | Image data |
| ImageOut | Output | emImage | Image data |

FLIP
Provides a mirror image of an image

| ImageIn | Input | emImage | Image data |
| ImageOut | Output | emImage | Image data |

IMAGE EDGES
Places a frame around an image. The color and style of the frame can be specified. Same frames have a separate inset edge as well. Selecting a frame with an inset edge results in an automatic prompt for selection of a color for the inset edge.

| ImageIn | Input | emImage | Image data |
| ImageOut | Output | emImage | Image data |

IMAGE INFO
Image data passes through this function unchanged. This function outputs information regarding the image. If a subsequent function modifies the image, a new Image Info function must be executed in order to provide accurate information. This function has no user defined settings.

| ImageIn | Input | emImage | Image data |
| ImageOut | Output | emImage | Image data |
| ImageName | Output | emString | File name of image with extension |
| ImagePathAndName | Output | emString | Complete path and file name |
| ImageW | Output | emString | Width of image in pixels |
| ImageH | Output | emString | Height of image in pixels |
| ImageRes | Output | emString | Image resolution in dpi |

IMAGE OBJECTS
Image data passes through this function unchanged. This function outputs objects which are respective parts of the image data. This function has no user defined settings.

| ImageIn | Input | emImage | Image data |
| ImageOut | Output | emImage | Image data |
| Layer1(2, 3, ...) | Output | emImage | Each image layer is supplied to a respective output |
| Mask | Output | emImage | A mask object (if present) |
| ImageName | Output | emString | File name of image with the extension |

IMAGE STAMPER
Places the image being processed onto a selected background image. The image size, image position, merge mode, transparency, and feathering effect can be specified. A preview window shows where the image is placed on the background. If Image Stamper is applied to a mask object, the mask is deleted and the added image object becomes the active object.

| ImageIn | Input | emImage | Image data |
| ImageOut | Output | emImage | Image data |

IMAGE TINT
Applies a tint effect to the image. The hue and saturation can be specified. A preview window shows the effect of the specified parameters on a sample image.

| ImageIn | Input | emImage | Image data |
| ImageOut | Output | emImage | Image data |

IMAGE WATERMARKING
Superimposes a selected image over the image being processed. By adjusting the transparency level, this can have the effect of stamping each image with a background watermark. If the preceding layer added to the image is a mask layer, then the added watermark is subject to the mask.

| ImageIn | Input | emImage | Image data |
| ImageOut | Output | emImage | Image data |

INVERT
Produces a color negative of an image. There are no user settings for this function.

| ImageIn | Input | emImage | Image data |
| ImageOut | Output | emImage | Image data |

NUMERIC FORMAT
Image data passes through this function unchanged. This function reformats a numeric string into one of several common formats (such as those provided in a program available under the tradename VisualBasic from Microsoft Corporation of Redmond, Washington). Available formats include "Currency", "Fixed", "Yes/No", and "True/False".

| ImageIn | Input | emImage | Image data |
| ImageOut | Output | emImage | Image data |
| InValue | Input | emString | Numeric string to format |
| OutValue | Output | emString | The formatted string |

OBJECT ATTRIBUTES
Adjusts how the last added object blends with the image, such as objects added by the Image Stamper, Image Watermarking, and Text Stamper functions. The merge mode, transparency, and feather of the object can be specified (which overrides pre-existing values for these settings).

| ImageIn | Input | emImage | Image data |
| ImageOut | Output | emImage | Image data |

RESOLUTION
Modifies the resolution of the image, in pixels per inch.

| ImageIn | Input | emImage | Image data |
| ImageOut | Output | emImage | Image data |

ROTATE
Rotates the image by the specified number of degrees (based upon a 360 degree circle) in a specified direction (clockwise or counter-clockwise).

| ImageIn | Input | emImage | Image data |
| ImageOut | Output | emImage | Image data |

SEND EMAIL
Image data passes through this function unchanged. If a specified condition is met, a specified message is sent to a specified email address. The specified condition may be selected from one of several options. For example, the condition may be met when a specified number of images have been processed.

| ImageIn | Input | emImage | Image data |
| ImageOut | Output | emImage | Image data |

SIZE
Adjusts the width and/or height of the image in pixels. If "Proportional Sizing" is enabled, the width and height aspect ratio is maintained.

| ImageIn | Input | emImage | Image data |
| ImageOut | Output | emImage | Image data |
| TempString | Input | emString | Any available text string |

TABLE 3-continued

ACTION DEFINITIONS

| Variable Name | Port | Type | Description |
|---|---|---|---|
| STRING BUILDER | | | |
| Image data passes through this function unchanged. This function outputs one or more strings which are each a combination of strings that are either internally pre-defined or obtained from input ports. Combining occurs according to a selected one of several predefined definitions, or according to a custom (user specified) definition. One of the internally defined strings can affect sequencing. Definitions for combining strings use the following syntax: Enclose variables and formulas in curly braces: "{MyVariable}". Any characters outside curly braces are placed in the resulting string as literals. Keywords are indicated by brackets, and must also be within a set of braces "{[Keyword]}". Available keywords include ImageName, ImageWidth, ImageHeight, and Seq. ImageName, ImageWidth, and ImageHeight work the same as their counterparts from Image Info, without any need for prior execution of the Image Info function. The Seq keyword defines a sequence that increments for each image processed. An example is Basename {[Seq.], X, Y, Z}, where X indicates the numeral/character to start from (e.g. "1" or "A"), Y indicates the increment step (e.g. "1"), and Z defines the number of characters in the sequence portion (e.g. "3") | | | |
| ImageIn | Input | emImage | Image data |
| ImageOut | Output | emImage | Image data |
| StrIn(2, . . .) | Input | emString | Any available text string. |
| StrOut(2, . . .) | Output | emString | A resulting output string from the String Builder. |
| TEXT STAMPER | | | |
| Applies a text object onto an image. The text can be defined in the function itself, or obtained through an input port. TextStamper provides control over the font, size, color, rotation, transparency, and position of the text. Text Stamper adds only one line of text; to add multiple lines use successive Text Stamper functions. If the preceding layer added to the image is a mask layer, then the added text is subject to the mask. | | | |
| ImageIn | Input | emImage | Image data |
| ImageOut | Output | emImage | Image data |
| TextIn | Input | emString | Any available text string |
| THUMB MAKER | | | |
| Produces a thumbnail version of the image picture. The size can be selected to be one of three common predefined thumbnail sizes, or a custom defined size. | | | |
| ImageIn | Input | emImage | Image data |
| ImageOut | Output | emImage | Image data |
| UNSHARP MASK | | | |
| Sharpens an image to an extent determined by three parameters: Radius, Strength and Threshold. | | | |
| ImageIn | Input | emImage | Image data |
| ImageOut | Output | emImage | Image data |

TABLE 4

DESTINATION DEFINITIONS

| Variable Name | Port | Type | Description |
|---|---|---|---|
| DATABASE OUTPUT | | | |
| Uses a database table or query to identify where to deposit processed data. Unless depositing only strings, one field in the table must contain a string with a complete path to the destination for the image data. May optionally select one or more additional fields in which separate string input will be deposited. The database table or query must already exist and be defined as an ODBC (Open DataBase Connectivity) connection prior to using this function. | | | |
| ImageIn | Input | emImage | Image data |
| SpecifiedField | Input | emString | Each selected field is filled with a respective string from an input port with the field name. |
| DESTINATION FOLDER | | | |
| Specifies where an image is to be placed when it is saved as output. If the source of the image (see TABLE 1) included sub-folders, mirroring of the subfolder structure may optionally be enabled. If a specified folder does not currently exist, it is created automatically. If a project uses virtual paths, the destination may be specified here as a virtual path. This function must precede the File Saver function in every project, unless the intent is simply to preview images without saving them. | | | |
| ImageIn | Input | emImage | Image data |
| ImageOut | Output | emImage | Image data |
| FILE NAMER | | | |
| Associates a file name with a processed image, where the file name is based on a string received through an input data port. Alternatively, the file name may be based on several strings received through multiple input ports, where these strings are concatenated with a specified separator character. | | | |
| ImageIn | Input | emImage | Image data |
| ImageOut | Output | emImage | Image data |
| Input1(2, 3, . . . etc) | Input | emString | Any available emString output ports. |
| FILE SAVER | | | |
| Saves the current image through a network to a specified location, including selection of a file format in which the image is to be saved. This may be different from the original format of the image, allowing conversion of file types. If the selected file type has options, an "Options" button is enabled, and may be clicked so that the additional settings can be adjusted to other than default settings. The transfer through the network is made according to the File Transfer Protocol (FTP). | | | |
| ImageIn | Input | emImage | Image data |
| IMAGE SEQUENCER | | | |
| Uses a specified base name to give sequenced names to successive files processed, in a manner similar to the "Seq" option of the String Builder function. | | | |
| ImageIn | Input | emImage | Image data |
| ImageOut | Output | emImage | Image data |

In FIG. 1, the modules within the project definition 14 are each shown as a rectangular box with a respective label of "source", "branch", "action", or "destination". Alternatively, however, within the scope of the present invention, these module types may each be visually represented by a respective icon. For example, FIGS. 2-5 show icons respectively representing a source module, a branch module, an action module, and a destination module. The particular icons shown in FIGS. 2-5 are exemplary icons used in the disclosed embodiments, and it will be recognized that a variety of other icons could alternatively be used.

Figure 6:
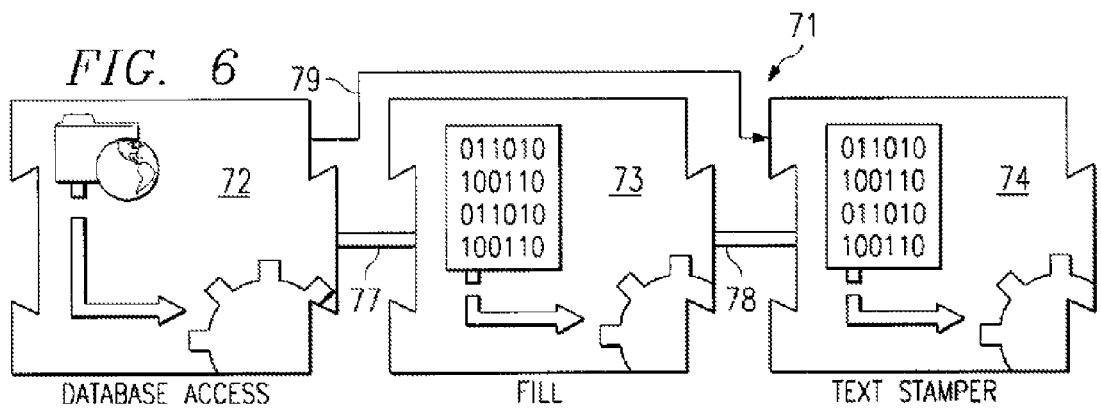
FIG. 6 is a diagrammatic view similar to FIG. 1 of a different project definition according to the present invention.

FIG. 6 is a block diagram of a very simple project definition 71, which will be used to demonstrate the format in which project definitions are stored for purposes of the disclosed embodiments of the present invention. The project definition 71 includes one source module 72, and two action modules 73 and 74. The binding lines for image data are indicated at 77 and 78, and a binding line for string data is indicated at 79. In order to keep the example simple, the project definition 71 does not include any branching or destination modules. It can be considered to be a project definition which is in the process of being created, but is not yet complete.

In the project definition 71, the source module 72 is a Database Access module. This particular Database Access module obtains image data by effecting a predefined query to a table in a database, and by obtaining from respective fields in each record of the table a first string which defines the path to the actual location of a file containing a respective image, and a second string which represents a corresponding price. The Database Access module 72 then uses each first string to retrieve the corresponding image, which is output at 77, while outputting at 79 for each image the corresponding second string which represents a price. Thus, the module 72 successively outputs a number of images and associated prices. The action module 73 is a Fill module, which adds color to an active object of the image, and then outputs at 78 the modified image data.

The action module 74 is a Text Stamper module, which superimposes onto the image data received at 78 the text string received at 79. As noted above, this text string represents a price. The text will be added as a new and further object in the image data, which thereafter becomes the active object.

Figure 7:
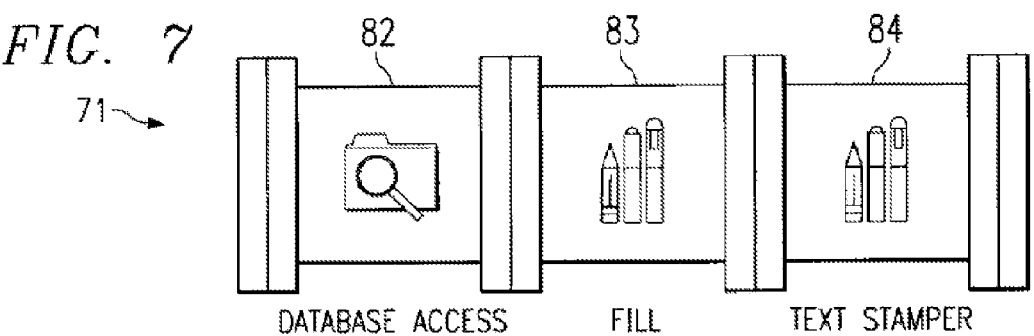
FIG. 7 is a diagrammatic view of a different way of visually representing the project definition of FIG. 6.

The project definition 71 of FIG. 6 can be represented visually in other ways. For example, FIG. 7 is a diagrammatic view showing the same project definition 71, but with a different visual appearance. In FIG. 7, there are three pipe sections 82-84 arranged end-to-end, so as to collectively give the appearance of a pipeline through which image data and/or other data can flow. The pipe section 82 represents the Database Access module, the pipe section 83 represents the Fill module, and the pipe section 84 represents the Text Stamper module. With respect to the binding lines 77-78 in FIG. 6, which represent image data, there are no corresponding binding lines in FIG. 7, because the end-to-end relationship of the pipe sections is representative of the flow of image data from module to module. With respect to the binding line 79 of FIG. 6, which represents text string data, it has been arbitrarily omitted in FIG. 7, in order to emphasize that this type of binding line can optionally be included or excluded from a view such as that shown in FIG. 7. Where the binding line is excluded, the text string data may be considered to be flowing through the pipeline with the image data. The modules 82-84 of FIG. 7 each have in the middle thereof an icon which is different from the icons shown in FIGS. 2, 4 and 6, in order to make the point that the invention permits the use of various different icons.

One feature of the present invention is that each project definition, such as those shown at 14 and 71 in FIGS. 1 and 6, is stored in a form which is expressed in a public communication protocol. The public communication protocol used in the disclosed embodiments is the extensible Markup Language (XML) protocol, which is well known in the industry. However, some other public communication protocol could alternatively be used. Referring to TABLE 5, the right column shows how the project definition 71 of FIG. 5 would be expressed in the XML protocol, according to the disclosed embodiments of the invention. For convenience, various levels of indentation have been provided in order to make the XML information more readable, but the indentation is not intended to suggest that the actual XML file 10 includes characters to effect such indentation. The line numbers presented in the left column of TABLE 5 are not part of the XML expression of the project definition, but instead have been added to sequentially number the lines of the XML definition, in order to facilitate an explanation of 15 the XML information, which is set forth below. For readability and convenience, some single lines of the XML file are shown as two or more lines in TABLE 5, and the line numbers added in the left column help show where this has occurred. Much of TABLE 5 is believed to be generally self-explanatory. Accordingly, the following discussion does not address every line in TABLE 5, but instead offers comments regarding only selected lines, as appropriate.

In this regard, line 1 shows that the project definition 71 as been arbitrarily given the name "Project Name". Line 2 refers to a group name, but the concept of groups has been included for a future purpose which is not relevant to an understanding of the present invention, and groups are therefore not discussed here.

Line 3 indicates that the process name has arbitrarily been set to be "First Process". In an XML definition of the type shown in FIG. 5, one process is defined first in its entirety, and then any other processes are each defined in their entirety, in a sequence. Within each process, the subprocesses are defined in sequence, with the main process being defined first in its entirety, after which the subprocesses (if any) are each being defined in their entirety, in sequence. In the simple project definition 71 shown in FIG. 6, of course, the project definition includes only one process, which in turn includes only one sub-process, namely the main process.

Line 4 of TABLE 5 identifies the beginning of a module list, which is a sequential listing of all modules in the main process portion of the process. As shown in FIG. 6, the main process of the project definition 71 has only the three modules 72-74. The Database Access module 72 is defined in lines 5-30 of TABLE 5, the Fill module 73 is defined in lines 31-43 of TABLE 5, and the Text Stamper module 74 is defined in lines 44-108 of TABLE 5. Line 109 identifies the end of the modules for the main process. Line 110 is a 50 heading which identifies where other sub-processes would be defined, if this process included any sub-processes other than the main process. Line 111 identifies the end of the first process. Lines 112-115 are headers which identify where one or more other processes of the project definition would be defined, if the project definition included more than one process. Lines 116-117 of TABLE 5 identify the end of the project definition.

Turning in more detail to lines 5-30 of TABLE 5, which define the Database Access module 72, line 5 includes an 60 "Id" of "com.image2web.databaseaccess" which, in the disclosed embodiments, is an internal code identifying a segment of object code that implements the functionality of the Database Access module. The next portion of line 5 refers to an "Instance", which in this example is set to the numeral 65 "1". This indicates that this is the first occurrence of the Database Access type of module in the project definition 71. If the project definition 71 included two or more Database Access modules, they would be respectively identified by successive integer instance numbers, corresponding to the order in which they appear in the XML file.

Lines 13-14 in TABLE 5 identify the database which should be accessed in order to retrieve image data, which in this case is a database named "photography". As noted in the explanation in TABLE 1 of the Database Access definition, the connection for this database must already exist and be defined as an Open DataBase Connectivity (ODBC) connection. This permits the Database Access module to easily interact with pre-existing databases through the use of public communication protocols, without any need to make any change to the databases. In the specific example of TABLE 5, the word "photography" in line 14 provides a unique link to an existing ODBC connection, which in turn provides the link to and query for the specified database. Lines 10-12 of TABLE 5 define the particular table within the database which is to be accessed. In this particular example, the "photography" database has several tables which are each named after a respective photographer, and that each relate to photographs taken by that particular photographer. Each table has a name which corresponds to the name of the associated photographer, which in this example is "Robert Shutterbug". Lines 7-9 and lines 20-22 of TABLE 5 each define a respective field within the indicated table, the contents of which are to be obtained by and output from the Database Access module 72.

Lines 25-29 of TABLE 5 define the various output ports of the Database Access module 72. In particular, line 28 defines an output port for the image data, which is associated with the binding line 77 in FIG. 6. Line 28 in TABLE 5 defines an output port for a string which represents a price, and which is associated with binding line 79 in FIG. 6. Line 27 defines an output port for the filename of the image, but this output port is not used in FIG. 6.

Turning to the Fill module 73, line 38 in TABLE 5 defines in input port for image data, and includes a term "BoundTo", which effectively defines the binding line 77 of FIG. 6, by identifying the output port of the module 72 to 10 which the input port of the module 73 is bound. Turning to the Text Stamper module 74 of FIG. 6, its definition in TABLE 5 appears at lines 44-108. Within this definition, lines 46-99 define a number of parameters, which are collectively referred to herein as control information, and which may be specified by a user in order to define the particular operational characteristics which this particular instance of the Text Stamper module is to have. For example, to the extent that the Text Stamper module 74 is superimposing onto an image some text which represents a price, the parameters define characteristics of that text, such as its location, font, size, color, and so forth. Line 103 of TABLE 5 defines the input port of the text stamper module at which it receives the image data, and includes a "BoundTo" term which defines its association with an output port of the Fill module 73. In other words, the "BoundTo" term defines the binding line 78 of FIG. 6. Similarly, line 102 of TABLE 5 defines for the Text Stamper module 74 an input port for text, which in this case represents a price. Line 102 also includes a "BoundTo" term which defines the association of this input port with an output port of the data access module 72, or in other words the binding line 79.

TABLE 5

PROJECT DEFINITIONS IN XML

```
  <Project Name="Project Name" Desc=" "
       Version="1.0">
2      < Group Name="Project Name" Desc=" ">
3         <Process Name="First Process" Desc=" ">
4            <ModuleList>
5               <Module Name~"Database_Access"
                   Id="com.image2web.databaseaccess"
                   Instance="1">
6               <Properties>
7                  <Property Name~"Output-ImageFilename"
                      DataType~"emVariant">
8                     <Value>ImageFilename</Value>
9                  </Property>
10                 <Property Name~"Table"
                      DataType~"emVariant">
11                    <Value>Robert Shutterbug</Value>
12                 </Property>
13                 <Property Name~"DSN"
                      DataType~"emVariant">
14                    <Value>photography</Value>
15                 </Property>
16                 <Property Name~"Input-Field"
                      DataType~"emVariant">
17                    <Desc>Image Path</Desc>
18                    <Value>ImageFilename</Value>
19                 </Property>
20                 <Property Name~"Output-Price"
                      DataType~"emVariant">
21                    <Value>Price</Value>
22                 </Property>
```

TABLE 5-continued

PROJECT DEFINITIONS IN XML

```
23                 </Properties>
24                 <Inputs/>
25                 <Outputs>
26                    <Property Name~"Price"
                         DataType~"emVariant"/>
27                    <Property Name~"ImageFilename"
                         DataType~"emVariant"/>
28                    <Property Name~"ImageOut"
                         DataType~"emImage"/>
29                 </Outputs>
30              </Module>
31              <Module Name~"Fill"
                   Id~"com.image2web.fill"Instance~"1">
32                 <Properties>
33                    <Property Name~"FillColor"
                         DataType~"emVariant">
34                       <Value>1973978</Value>
35                    </Property>
36                 </Properties>
37                 <Inputs>
38                    <Property Name~"ImageIn"
                         DataType~"emImage"
                         BoundTo~"com.image2web.database
                         access.1.0utput.ImageOut"/>
39                 </Inputs>
40                 <Outputs>
41                    <Property Name~"ImageOut"
                         DataType~"emImage"/>
42                 </Outputs>
43              </Module>
44              <Module Name~"Text_Stamper"
                   Id~"com.image2web.textstamper"
                   Instance="1">
45                 <Properties>
46                    <Property Name~"PageColor"
                         DataType~"emVariant">
47                       <Value>16777215</Value>
48                    </Property>
49                    <Property Name~"LiteralXPosition"
                         DataType="emVariant">
50                       <Value>0</Value>
51                    </Property>
52                    <Property Name~"Bold"
                         DataType~"emVariant">
53                       <Value>0</Value>
54                    </Property>
55                    <Property Name~"Transparency"
                         DataType~"emVariant">
56                       <Value>100</Value>
57                    </Property>
58                    <Property Name~"FontSize"
                         DataType~"emVariant">
59                       <Value>24</Value>
60                    </Property>
61                    <Property Name~"Bound"
                         DataType~"emVariant">
62                       <Value>-1 </Value>
63                    </Property>
64                    <Property Name~"BorderText"
                         DataType~"emVariant">
65                       <Value>0</Value>
66                    </Property>
67                    <Property Name~"MergeMode"
                         DataType~"emVariant">
68                       <Value>Normal</Value>
69                    </Property>
70                    <Property Name~"Underline"
                         DataType~"emVariant">
71                       <Value>0</Value>
72                    </Property>
73                    <Property Name~"BoundName"
                         DataType~"emVariant">
74                       <Value>Price</Value>
75                    </Property>
76                    <Property Name~"ExpandToFit"
                         DataType~"emVariant">
77                       <Value>-1 </Value>
78                    </Property>
```

TABLE 5-continued

PROJECT DEFINITIONS IN XML

```
79              <Property Name~"Color"
                    DataType~"emVariant">
80                  <Value>0</Value>
81              </Property>
82              <Property Name~"TextPosition"
                    DataType~"emVariant">
83                  <Value>CenterCenter</Value>
84              </Property>
85                  <Property Name~"LiteralYPosition"
                        DataType~"emVariant">
86                      <Value>0</Value>
87                  </Property>
88                  <Property Name~"Angle"
                        DataType~"emVariant">
89                      <Value>0</Value>
90                  </Property>
91                  <Property Name~"Font"
                        DataType~"emVariant">
92                      <Value>Ariak/Value>
93                  </Property>
94                      <Property Name~"UseLiteralPosition"
                            DataType~"emVariant">
95                          <Value>0</Value>
96                      </Property>
97                          <Property Name~"Italic"
                                DataType~"emVariant">
98                              <Value>0</Value>
99                          </Property>
100                 </Properties>
101             <Inputs>
102                 <Property Name~"TextLine"
                        DataType~"emVariant"
                        BoundTo~"com.image2web.database
                        access.1.0utput.ImageFilename"/>
103                 <Property Name~"ImageIn"
                        DataType~"emImage"
                        BoundTo~"com.image2web.fill.1.
                        Output.ImageOut"/>
104             </Inputs>
105             <Outputs/>
106                 <Property Name~"ImageOut"
                        DataType~"emImage"/>
107             </Outputs>
108         </Module>
109     </ModuleList>
110     <SubProcessList/>
111   </Process>
112   <Process Name="Second Process" Desc=" ">
113     <ModuleList/>
114     <SubProcessList/>
115   </Process>
116 </Group>
117 </Project>
```

Figure 8:
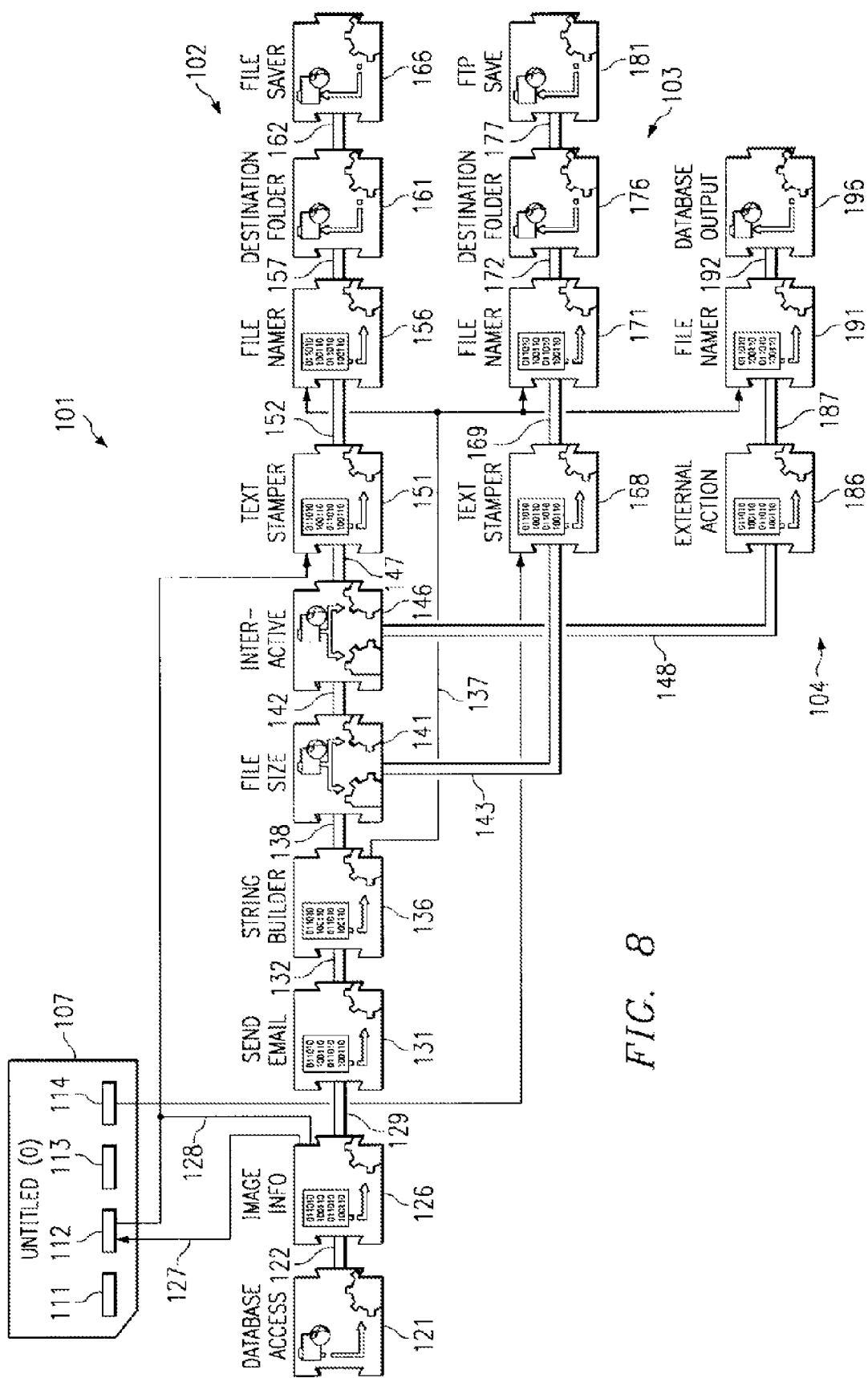
FIG. 8 is a diagrammatic view similar to FIG. 1 of yet another project definition according to the present invention.

The project definitions discussed above in association with FIGS. 1 and 6-7 are relatively simple. FIG. 8 is a diagrammatic view of a further project definition 101, which is more sophisticated. It includes a single process which is shown in its entirety in FIG. 8, and which includes three sub-processes 102-104, namely a main process 102, and two further sub-processes 103 and 104. It also includes a feature which has not previously been discussed, which is a global portion 107 having a plurality of global ports 111-114.

The ports 111-114 of the global portion 107 can be accessed by modules within the main process 102 or by modules within either of the sub-processes 103-104. The ports 111-114 can each act as an input port and/or an output port, depending on the particular operational configuration. More specifically, the ports 111-114 can each act as a form of register or memory location, in which one module can store information, and from which another module can later read it. The data in the port can thus change dynamically during project execution. The port 112 in FIG. 8 is configured to operate in this manner, and thus acts as both an input port and an output port. Further, the ports 111-114 can each be initialized to a predetermined value. If no module changes the initial value stored in that port, then that initial value serves as a form of data constant which does not change, and which can be accessed by any module throughout execution of the project definition. In FIG. 8, the port 114 is configured to act in this manner, and thus acts as an output port. In more detail, the port 114 is initialized to a string value which is superimposed onto images, as explained later.

If, in addition to the process defined by the main process 102 and the sub-processes 103-104, the project definition 101 included an additional process, then each process would have its own global portion 107. The ports of each global portion 107 would be global to the associated process, but not the other process. In addition to the two global portions 107, a further global portion would appear in FIG. 8 adjacent the global portion 107. The ports of the further global portion would be global to both processes, or in other words the entire project definition. The ports of the further global portion could be referred to as project level ports, and the ports of each of the global portions 107 could be referred to as process level ports.

The various types of modules which make up the project definition 101 of FIG. 8 are each described in TABLES 1-4. However, for purposes of clarity and completeness, each is also briefly discussed below. More specifically, the main process 102 includes a Database Access module 121, which obtains and outputs a plurality of successive images from a not-illustrated database, in a manner similar to that discussed above in association with the Database Access module 72 of FIG. 6. These images are supplied at 122 to an Image Info module 126.

The Image Info module 126 does not change the image data, but does output certain information about the image data, including the height of the image at 127 and the width of the image at 128. The height and width are each output in the form of a string representation of a numeric value which is the number of pixels in the height or width. The height is supplied at 127 to the port 112 of the global portion 107, and is saved there for later use. The width is output at 128. The binding line 128 is a special type of binding line known as a conditional binding, which is explained later. The module 126 outputs the unchanged image data at 129, where it flows to a Send Email module 131.

The module 131 does not change the image data, but sends an email (electronic mail message) in response to the occurrence of a predefined condition, where the email is a predefined text message that is sent to a predefined email address. In the Send Email module 131 of the project definition 101, the condition that causes the module 131 to send an email is met when the last image produced by the Database Access module 121 is being processed. There are various ways in which this could be detected, for example by counting images if the number of images to be processed is known in advance, or by detecting a predetermined file name assigned to the last image. Alternatively, as a process completes, an "execution finished" message could be provided to all modules of the process, or at least to each Send Email module in the process, thereby causing each Send Email module to proceed to send its email. The text of the email might notify a person that all of the image data in question has been processed by the project definition 101, and is available for use.

The unchanged image data from the module 131 flows at 132 to a String Builder module 136, which does not change the image data. As explained in TABLE 3, the String Builder module 136 can generate a sequence of names, where each name in the sequence is generated when a respective one of the images passes through the module 136. In the project definition 101, the module 136 is configured to generate a sequence of names which are "Image01" "Image02", "Image03", and so forth. These sequential names are successively supplied through an output port of the String Builder module 136, which is associated with a binding line 137.

The unchanged image data from the Stringer Builder module 136 flows at 138 to a File Size module 141. The module 141 does not change the image data. It outputs the image data at either 142 or 143, depending on the size of the file which contains the image data, in a manner already discussed above. Image data that is output at 143 flows to the sub-process 103, as discussed later. Image data that is output at 142 flows to an Interactive module 146 of the main process 102.

The Interactive module 146 does not change the image data. It does pause execution of the project definition 101, while requesting that a person manually specify where the current image is to be sent. In particular, the person can specify that the current image is to be sent at 148 to the sub-process 104, or that the image can continue at 147 along the main process 102. In view of the fact that the Interactive module 147 has the effect of pausing execution for each image processed by the project definition 101, and in view of the fact that an important application of the present invention is automated processing of data, modules of the Interactive type would typically be omitted from most project definitions. However, the Interactive module 146 has been included in the exemplary project definition 101 of FIG. 8 in order to facilitate a better understanding of this feature of the present invention. With reference to TABLE 2, and as discussed in more detail later, the Interactive module 146 provides a user with the capability to manually and interactively specify whether data is to be directed to 147 or 148. In addition, it provides the user with the capability to specify that the Interactive module 146 should automatically take a specified action for all subsequent images which are processed during the current execution of the project definition 101. Assuming that, in response to a query from the Interactive module 146, a person indicates that image data from the module 146 is to continue along the main process 102, the module 146 causes the unchanged image data to flow at 147 to a Text Stamper module 151.

The Text Stamper module 151 has an additional input port, which is associated by the binding line 128 with the image width output from the Image Info module 126, and also with the port 112 of the global portion 107. As mentioned above, the binding line 128 is a conditional binding. This means that the binding 128 can selectively supply data to the input port of the Text Stamper module 151 from either of two different output ports, which in FIG. 8 are the image width output of the module 126, and the port 112 of the global portion 107. Conceptually, the condition should be viewed as an internal part of the binding 128 itself, rather than as a part of the global portion 107, the module 126, or the module 151. Considered this way, it will be recognized that the condition can be based on data which is available to the binding 128 from either of the associated output ports, which in FIG. 8 include the image height information and image width information that it respectively receives from the output ports of the global portion 107 and the module 126. For example, the condition might be set to specify that the binding 128 is to compare the height and width values, and to supply the larger of the two values to the Text Stamper module 151.

The Text Stamper module 151 takes the height or width value received from the conditional binding 128, and superimposes it on the image received at 147. The height or width information becomes a separate object which is part of the overall image data. All of the objects of the image data are supplied at 152 to a File Namer module 156.

The module 156 associates with the image data a file name, under which the image data will eventually be stored. For this purpose, the File Namer module 156 has an input port coupled through the binding 137 to module 136. As discussed above, the module 136 generates a unique sequenced name as each respective image is processed. Accordingly, module 156 associates the unique name from binding 137 with the image currently passing through the module 156, and then forwards the image data and newly associated name at 157 to a Destination Folder module 161. Aside from associating a name with the image data, the File Namer module 156 does not change the image data itself.

The Destination Folder module 161 defines the name of a folder or subdirectory into which images processed by the main process 102 are to be deposited. In essence, the File Namer module 156 associates with the image data a file name, and the Destination Folder module 161 associates with the image data a path to a subdirectory. The module 161 does not change the image data itself. The image data with its associated information is supplied at 162 to a File Saver module 166.

The File Saver module 166 is responsible for actually saving the data, and can also specify which of several common image formats the image data is to be saved in. The File Saver module 166 saves the image data in the folder or subdirectory specified by module 161, under the file name specified by module 156, and in the format specified by the File Saver module 166 itself.

The File Saver module 166 is configured to save the data locally with respect to the computer which is executing the project definition 101, for example within the context of an intranet or LAN, but not to a remote location that can only be accessed through a non-local network such as the Internet.

Returning to the File Size module 141, it was explained above that, depending on file size, certain images would be routed at 143 to the sub-process 103. In particular, these images will be routed to an input port of a Text Stamper module 168. The module 168 superimposes on each such image a non-changing text string, which it obtains through an input port from the output port 114 of the global portion 107. This superimposed text is added to the image data in the form of an additional object, which becomes a part of the image data. All of the objects of the image data are supplied at 169 to a File Namer module 171.

The File Namer module 171 operates in the same manner as described above for the File Namer module 156, and then supplies the image data and associated information at 172 to a Destination Folder module 176. The module 172 operates in the same manner as the Destination Folder module 161, except that it uses a different name for the destination folder. The image data and associated information are then supplied at 177 to an FTP Save module 181.

The FTP Save module 181 uses the File Transfer Protocol (FTP) to transfer the processed image data and associated information through a network to a specified destination, where it is saved in a folder having the name specified by the Destination Folder module 176, under a name specified by the File Namer module 171, and in a format specified by the FTP Save module 181. The module 181 is capable of saving data to a remote location, for example through the Internet.

Returning to the Interactive module 146, it was explained above that a user can selectively specify that a current image is to continue at 147 along the main process 102, or is to be routed at 148 to the sub-process 104. In the sub-process 104, this image is received at an input port of an External Action module 186. The module 186 is designed to cooperate with a separately and independently executing application program, which in the disclosed embodiments is an image processing program, such as the program that is commercially available under the tradename PHOTOSHOP from Adobe Systems Incorporated of San Jose, Calif. It is to be understood that this separate application program is operative only when accessed through an External Action module. Thus, for example, where this application program is an image processing program, it only performs image processing functions initiated through an External Action module. The image processing functions implemented by other modules are implemented by other software, as discussed in more detail later.

The External Action module 186 includes a command which was specified by the person who created the project definition 101, and which is a command that the separate image processing program is capable of executing. The module 186 supplies the current image and also the command to the image processing program, which then executes the command while processing the image in the manner specified by the command. The image processing program then returns the processed image to the External Action module 186, which supplies the processed image at 187 to a File Namer module 191.

The File Namer module 191 operates in the same manner as described above for the modules 156 and 171, and then outputs image data and an associated name at 192 to a Database Output module 196. The Database Output module 196 operates in a manner similar to the Database Access module 121, except that it saves data rather than reading data. The data is saved under the file name specified by module 191.

Figure 9B:
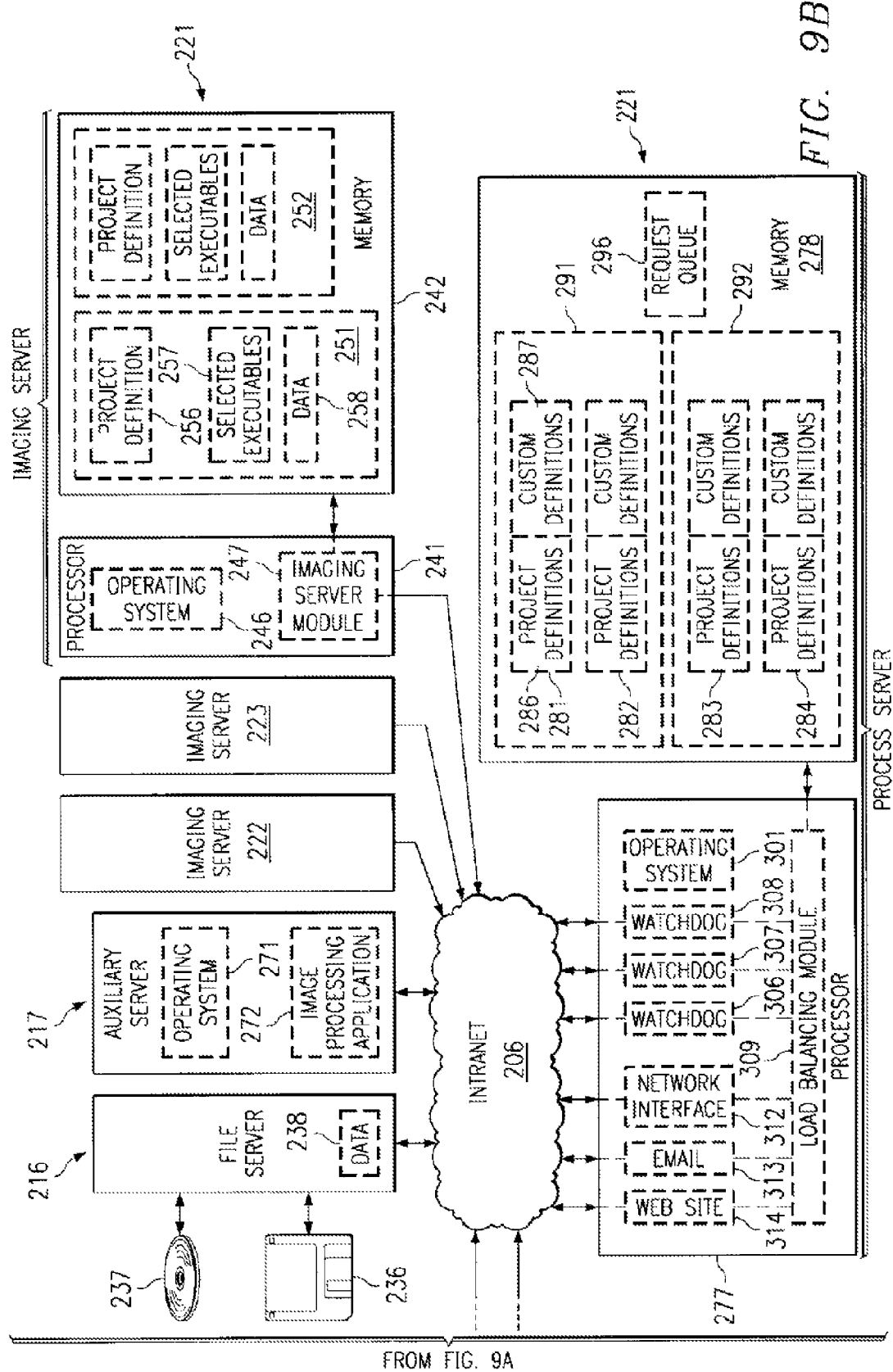
FIG. 9 is a block diagram of a system which embodies the present invention, including the capability to create and execute project definitions of the type shown in FIGS. 1 and 6-8.

FIG. 9 is a block diagram of a system 201 which implements the present invention. The configuration of the system 201 is exemplary, and a wide variety of changes could be made to this system while maintaining compatibility with implementation of the present invention. The system 201 includes an intranet 206, such as a local area network (LAN), which is coupled through a "Web" server 207 to a wide area network (WAN), such as the Internet 208. The intranet 206 is coupled to a workstation 211, a process server 212, a file server 216, an auxiliary server 217, and three imaging servers 221-223. The Internet 208 is coupled to a workstation 226, a database 227, a File Transfer Protocol (FTP) site 231, and an enterprise resource management (ERM) program 232. The ERM program provides support in areas such as human resources and financial matters. The ERM program 232 may, for example, be the program commercially available under the tradename PEOPLESOFT from PeopleSoft, Inc. of Pleasanton, Calif. It will be recognized that the devices coupled to the Internet 208 in FIG. 9 could alternatively be coupled to the intranet 206, and that the devices coupled to the intranet 206 could alternatively be coupled to the Internet 208.

The computers and related hardware shown in FIG. 9 are all of a type known in the art. For purposes of explaining the present invention, the following discussion will focus on the manner in which these known hardware components are configured into a system, and the various software programs which are executed by the various computers of FIG. 9.

The file server 216 can receive data files from portable media such as a standard floppy disk 236, or a standard compact disk 237, and can store this data at 238, for example in a hard disk drive. Conversely, some or all of the data stored at 238 can be offloaded onto a floppy disk 236 and/or a read/write compact disk 237. The data stored on the floppy disk 236 or the compact disk 237 will typically be in a compressed format, which conforms to an industry-standard compression technique. Consequently, the file server 216 has the capability to uncompress data that is read from the floppy disk 236 or the compact disk 237, before that data is stored at 238. Similarly, the file server 216 has the capability to compress data obtained from 238 before writing it to the floppy disk 236 or the compact disk 237.

The imaging servers 221-223 are all effectively identical, and therefore only the imaging server 221 is illustrated and described here in detail. The imaging server 221 includes a processor 241 and a memory 242. The processor 241 runs an operating system 246, which in the disclosed embodiments is one of the versions of an operating system that is commercially available under the tradename WINDOWS from Microsoft Corporation of Redmond, Wash. However, it could be some other operating system. Running on the operating system 246 within the processor 241 is a program which is an imaging server module 247. The memory 242 stores two tasks 251 and 252, which each include a project definition 256, selected executables 257, and data 258.

With respect to the imaging server 221, as well as other servers and workstations discussed later, it will be recognized that the dividing line between what is in the processor in FIG. 9 and what is in the memory has been drawn somewhat arbitrarily. For example, programs such as the operating system 246 and the imaging server module 247 are each depicted in the processor, but also use a certain amount of the memory 242. Conversely, the memory 242 is depicted as containing some executable code at 257, but the actual execution of this code will ultimately occur within the processor 241. Nevertheless, it is believed that those skilled in the art will readily comprehend these distinctions, and the breakdown shown in FIG. 9 has been selected to facilitate a clear understanding of the present invention.

In the imaging server 221, the imaging server module 247 executes project definitions of the type discussed above with respect to FIGS. 1 and 6-8. In particular, it obtains data through the intranet 206 and/or the Internet 208, processes the data in the manner specified by the project definition, and then deposits the processed data to a data destination through the intranet 206 and/or the Internet 208. If the data arrives at the imaging server 221 in a compressed format, the imaging server can uncompress the data before processing it. Similarly, where appropriate, the imaging server 221 can compress data before saving it to a data destination. Transmission of data from data sources and to data destinations through the networks is effected according to an appropriate public communication protocol, such as the FTP protocol, the XML protocol, the HyperText Transport Protocol (HTTP), or some other suitable protocol. FIG. 9 shows several examples of devices that the imaging server module 247 can write data to and/or read data from. These include the FTP site 231, the database 227, the ERM 232, and the file server 216.

In general, and as discussed later, the information contained in tasks 251 and 252 is a copy of information that is also present elsewhere in the system 201. The copy of this information is supplied to the memory 242 of the server 221 on a temporary basis, for purposes of permitting the server 221 to execute a project definition associated with each such task. In more detail, the project definition 256 in each of the tasks 251 and 252 is a respective project definition of the general type discussed above in association with FIGS. 1 and 6-8, and is stored in an XML format consistent with the example shown in TABLE 5. The data 258 represents temporary storage for data that is being processed by the associated project definition 256. One example of such data is images that have been obtained from a source such as the FTP site 231, and that will be returned to a destination such as the FTP site 231 after they have been processed. The selected executables 257 are selected object code files, which may or may not be present in a given task 251 or 252. Whether or not there are executables stored at 257 is a function of the above-mentioned capability for creating custom modules.

In this regard, the imaging server module 247 knows how to execute definitions for standard modules, including those set forth in Tables 1-4. However, it cannot inherently know how to execute definitions for custom modules. Accordingly, if a given project definition 256 happens to include one or more custom modules, then object code files that are capable of implementing those custom modules are included at 257 in the task 251 or 251 for that project definition, so that the imaging server module 247 will have the additional intelligence that it needs to execute the custom modules in the project definition.

Although the tasks 251 and 252 in the disclosed embodiments each include a project definition at 256 and selected executables at 257, it would alternatively be possible to use pointers rather than the actual data. That is, the tasks 251 and 252 could include at 256 a pointer to the pertinent project definition as stored in the process server 212, and could include at 257 one or more pointers to the selected executables as stored within the process server 212. The imaging server 221 could then use the pointers to download from the process server 212 only the information which it needed.

Although FIG. 9 shows that the imaging server 221 has been supplied with two tasks 251 and 252, which each correspond to a respective project definition, the number of tasks being handled by the imaging server 221 at any given point in time could be higher or lower. In particular, the imaging server 221 might be handling only one task, or might be handling several tasks. In general, to the extent that the imaging server 221 has two or more task at any given point in time, it will be executing the tasks in parallel, for example by supplying slices of processor time to each task in a manner which keeps each task moving along as efficiently as possible. In this regard, if one of the tasks is processing image data obtained from the FTP site 231 through the Internet 208 and intranet 206, there are likely to be times when that task is essentially idle, because it is 25 waiting for more image data, and thus the processor can be concentrating on execution of one or more other tasks. The same is true when any other task becomes idle for some reason, because the processor will concentrate on remaining tasks which are currently active. If the set of tasks assigned to a given processor are not cumulatively keeping the processor busy almost all of the time, still another task can be assigned to the processor, in a manner described later.

In the embodiment of FIG. 9, a single instance of the imaging server module 247 is used in each of the imaging servers 221-223, and can execute multiple project definitions. However, it would alternatively be possible for each imaging server 221-223 to execute two or more instances of the project server module 247, where each such instance was responsible for executing a respective one of the project definitions.

The auxiliary server 217 executes an operating system 271, which in the disclosed embodiments is a version of the operating system available under the trade name WINDOWS. Running on the operating system 271 within the auxiliary server 217 is an image processing application program 272, which in the disclosed embodiments is a program commercially available under the tradename PHOTOSHOP from Adobe Systems Incorporated of San Jose, Calif. However, some other image processing application program, or some other type of application program, could alternatively be used. Moreover, even though the embodiment of FIG. 9 has the application program 272 running on a computer 217 which is physically separate from other computers in the system 201, it would alternatively be possible for the application program 272 to run on one of the other computers in the system 201, such as the process server 212 or one of the imaging servers 221-223.

If one of the imaging servers 221-223 is executing a project definition which includes an External Action module, then in order to execute that External Action module, the imaging server passes the current image and a specified command through the intranet 206 to the auxiliary server 217. The image processing application 272 in the auxiliary server 217 then executes the command so as to effect the specified processing of the image, and then returns the processed image through the intranet 206 to the imaging server. When the system 201 is operational, the auxiliary server 217 and the image processing application 272 normally run all of the time, and are thus typically ready and waiting when an image and associated command arrive through the intranet 206. As noted above, the application program 272 is effective only as to functions initiated through an External Action module, such as the External Action module shown at 186 in FIG. 8. Thus, where the application program 272 is an image processing program, it implements only image processing functions initiated by an External Action module. Image processing functions initiated by all other types of modules are implemented by other software, such as the imaging server program 247 that runs on each imaging server 221-223.

The process server 212, which may alternatively be referred to as a load balancing server, is responsible for monitoring the imaging servers 221-223, and allocating tasks to the imaging servers 221-223 in dependence on factors such as their current level of efficiency, which reflects their availability to take on execution of additional project definitions. The manner in which this occurs is described below. The various software programs that run on the process server 212 may be referred to collectively as a process server framework.

The process server 212 includes a processor 277 and a memory 278. The memory stores a number of sets of user data, which are each associated with a particular person. For the sake of example, four sets of such user data are shown at 281-284, but in practice the process server 212 will store a much larger number of sets of user data. Each set of user data includes one or more project definitions 286, and one or more custom definitions 287. It is possible for a user, for example at one of the workstations 211 or 226, to store a project definition in his or her portion 286 of the memory 278. This can also be referred to as "publishing" the project definition to the process server 212. Whenever a project definition is published to the process server 212, the object code for any custom modules used in that project definition will automatically and simultaneously be published with it, and in particular will be stored in that user's custom definition portion 287 of the memory 278. Further, when a project definition is published to the process server 212, the local copy of the project definition in the workstation 211 will be automatically deleted, unless the user specifically indicates that it should be saved. Although a user has access to his or her own project definitions 286 and any associated custom definitions 287, others will not have access to them, except to the extent that the user elects to give them access. In this regard, the user data 281-284 in FIG. 9 is organized into two groups 291 and 292, where the group 291 includes the user data 281 and 282, and the group 292 includes the user data 283 and 284. In this disclosed embodiment, the groups 291 and 292 each correspond to a respective different entity. For example, the group 291 may correspond to a first corporation, where the user data 291 and the user data 292 respectively correspond to two different employees of that corporation, and the group 292 may correspond to a second corporation, where the user data 293 and the user data 294 respectively correspond to two different employees of the second corporation. When a user publishes project definitions and any associated custom definitions to the process server 212, it is possible to do so in a manner so that other users within the same organization or entity can have access to specified project definitions and/or custom definitions. Thus, for example, the user associated with the data 282 may be given access to some or all of the project definitions at 281, which will automatically include access to any custom definitions used by those project definitions. Also, the user associated with data 282 may separately be given access to some or all of the custom definitions at 281, even if the user has not been given access to any of the project definitions at 281.

The disclosed embodiment contemplates that this cross access to project definitions and custom definitions will be limited to users within a given entity, such as the entity 291 or the entity 292, and that users in one entity such as the entity 291 will not be able to have access to data of users in another entity such as the entity 292. However, in an alternative embodiment, cross access to user data could occur between users in two different entities.

A user at one of the workstations 211 or 226 may upload to that workstation any project definition from the process server 212 to which that user has access. In doing so, the user may either make a copy of the project definition, such that the original in the imaging server remains available to anyone that has access to it. Alternatively, the user may upload a project definition through a "check out" procedure which makes the project definition in the process server unavailable to everyone until the user checks the copy back in (along with any changes that the user may have made to the copy).

The memory 278 also stores a request queue 296. Execution of one of the project definitions 286 is initiated in response to receipt by the process server 212 of a request. Such a request may arrive through the intranet 206 and/or Internet 208, for example from a user at one of the workstations 211 and 226. When the request arrives, the request is temporarily placed in the queue 296, which implements a first-in, first-out stack. Typically, the request will identify one of the project definitions stored at 286 in one of the sets of user data 281-284. Alternatively, however, the request may be accompanied by a project definition and any custom definitions used by that project definition, which are then temporarily stored in the user data 281 for that user, until execution of that project definition has been completed.

Requests for the queue 296 may also originate in some other manner. For example, assume that a given project definition stored in one of the portions 286 of the memory 278 processes data from the database 227. The database 227 may include a script or other intelligence which, in response to a change to the pertinent source data in the database 227, automatically generates and sends to the process server 212 a request for execution of the given project definition, so that the modified data will be automatically processed. According to a feature of the invention, each request sent from any source to the process server 212 is expressed in a public communication protocol, which in the disclosed embodiments is the XML protocol. The manner in which the process server 212 handles the requests in the queue 296 will be discussed later The processor 277 of the process server 212 executes an operating system 301 which, in the disclosed embodiments, is one of the versions of the operating system available under the tradename WINDOWS. Running on the operating system 301 are three watchdog programs 306-308, which each serve as an interface to a respective one of the imaging servers 221-223, and which each have the additional responsibility of monitoring operation of the associated imaging server 221-223, as discussed in more detail later.

Also running on the operating system 301 is a load balancing module program 309, which monitors the workloads and efficiency of each of the imaging servers 221-223. The load balancing module 309 allocates execution of project definitions among the servers 221-223 on the basis of their workloads and efficiency, in a manner described below. The load balancing module 309 is interfaced to the intranet 206 by a network interface program 312, by an email program 313, and by a Web site program 314. It will be recognized that the functions of the programs 312-314 are interrelated, in that they each implement capability to communicate through the intranet 206. Thus, they could conceivably be implemented as respective portions of a single program. However, they are shown separately in FIG. 9 for purposes of clarity in presenting the present invention.

The Web site program 314 implements one or more Internet Web sites, which can be accessed through the intranet 206 and/or Internet 208, for example by a network browser program running on either of the workstations 211 or 226. The purpose of the Web site program 314 is discussed in more detail later. The email program 313 provides the load balancing module 309 with the capability to send and receive emails. For example, if one of the imaging servers 221-223 is executing a project definition which includes a Send Email module (TABLE 3), that imaging server will send appropriate information from this module across the intranet 206 and through the associated watchdog 306-308 to the load balancing module 309, which will then cause the email program 313 to transmit the email. It will be recognized that this email capability could alternatively be provided directly in each of the imaging server modules 247, so that imaging servers 221-223 can directly send such emails. The network interface program 312 is used to facilitate other types of communication through the intranet 206 and/or Internet 208 by the process server 212 with respect to other systems on the network, such as one of the workstations 211 and 226.

Figure 10:
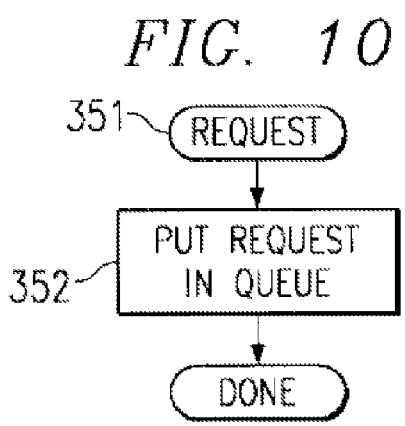
FIGS. 10-12 are each a flowchart showing a respective sequence of operations carried out by respective portions of the software within the system of FIG. 9.

Certain aspects of the operation of the process server 212 will now be described with reference to FIGS. 10-12, each of which is a flowchart. More specifically, FIG. 10 is a flowchart showing what happens when the process server 212 receives a request, for example through one of the network interface program 312, email program 313 and Web site 314. Receipt of the request at 351 causes control to proceed to block 352, where the request is put into the queue 296. Control then returns to whatever was in progress at the time the request was received.

Figure 11:
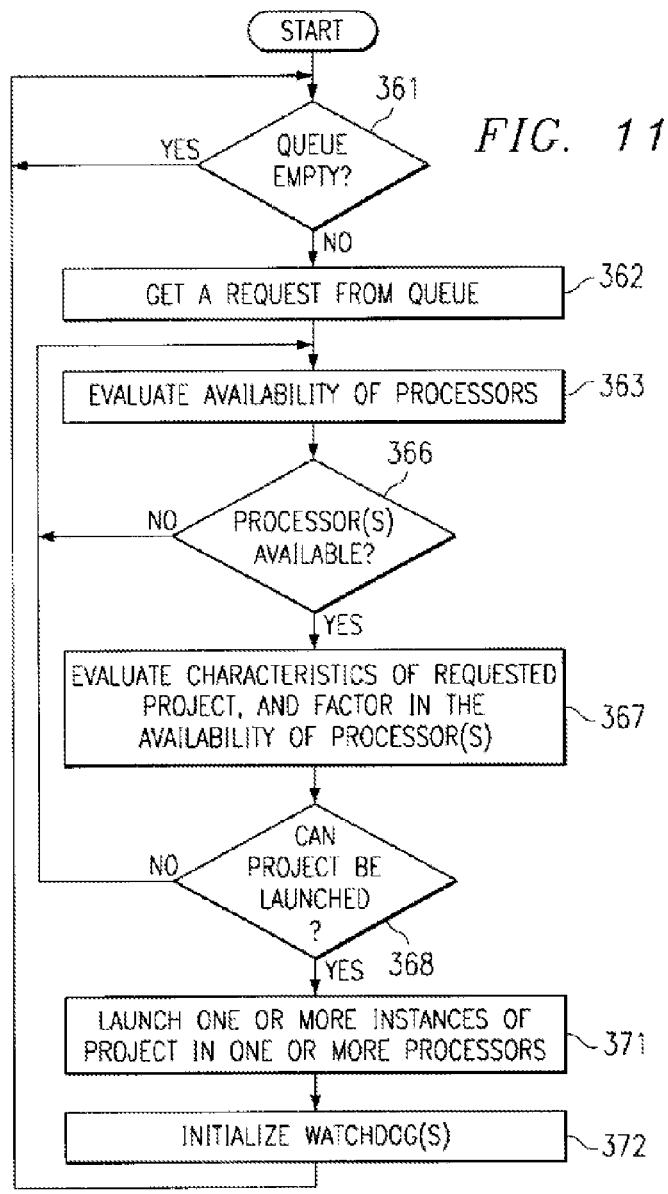

FIG. 11 is a flowchart showing a portion of the operation of the load balancing module 309, and in particular deals with how tasks corresponding to the requests in the queue 296 are allocated among the imaging servers 221-223. At block 361, the processor 277 checks to see whether the queue 296 is empty. If it is empty, then the processor waits at block 361 until there is at least one request in the queue. Of course, the activity depicted in FIG. 11 will typically be carried out on a time sliced basis, such that the processor 277 will be simultaneously executing other routines in parallel with the loop shown in FIG. 11, including the routine shown in FIG. 10.

When it is determined at block 261 that the queue 296 includes at least one request, then control proceeds from block 361 to block 362. In block 362, the processor 277 retrieves from the queue 296 the request which has been in the queue the longest. Then, at block 363, the load balancing module 309 in the processor 277 interacts with the imaging servers 221-223 through the watchdogs 306-308 and the intranet 206, in order to determine the extent to which each has available capacity for additional work. If none of them has any significant amount of available capacity, then at block 366 control is returned to block 363, in order to continue to evaluate availability of the processors in the imaging servers, until it is determined at block 366 that at least one of the imaging servers 221-223 has some available processing capability.

Control then proceeds from block 366 to block 367, where the load balancing module 309 evaluates the project definition 286 associated with the request which was retrieved from the queue at block 362. This evaluation may include inspection not only of the project definition itself, but also some of the data which is slated to be processed by that project definition. The evaluated characteristics may include the complexity of the project definition, and also the type and amount of data which that project definition is slated to process. For example, in the case of image data, the amount of image data depends on both the number of images and also the size of the images.

Control then proceeds to block 368, where the evaluations made in blocks 363 and 367 are used to determine whether it is possible to launch execution the project definition which is identified by the request drawn from the queue at 362. In this regard, there are several different ways in which a given project definition can be launched. First, if one of the imaging servers 221-223 has a level of availability which will permit it to take on execution of the project definition in question; execution of the project definition can be launched on that imaging server alone. However, if the project definition itself is relatively complex, and/or if there is a relatively large amount of data which it must process, two or more instances of the project definition may be launched, each configured to process a respective mutually exclusive portion of the specified data. A decision needs to be made as to whether to launch them on the same processor or on different processors.

In more detail, where it appears that two or more instances of the same project definition should be launched, the load balancing server must also factor in the available capacity of the imaging servers 221-223. Assuming that there is a satisfactory level of capacity in the imaging servers, each instance of the given project definition will typically be launched on a respective different one of the imaging servers 221-223. However, where one of the imaging servers 221-223 has significant capacity, it is possible that two or more instances of the same project definition could be launched on the same processor, if it appeared that the project definition and associated data were such that both instances could be efficiently processed at the same time. In this regard, and as noted above, there will be points in time when the execution of a project definition is temporarily idle, for example because it is waiting for data to arrive through a network, or because it includes an Interactive module (TABLE 2) and is waiting for a user response. When one instance of the project definition is idle, the other instance(s) can be active, as a result of which it is possible for a single processor to more quickly execute two instances of the same project definition handling respective portion of the data than to execute a single instance handling all the 55 data.

If it is determined at block 368 that there is an appropriate way to launch the project definition in question, control proceeds from block 368 to block 371, where the project definition is launched in the form of one or more instances on one or more imaging servers. Each such instance is launched by having the load balancing module 309 configure a task of the type shown at 251 or 252 (FIG. 9), including the project definition at 256, and including at 257 any executables that correspond to any custom definitions which are used in that project definition. Control then proceeds from block 371 to block 372, where the load balancing module 309 provides to one or more of the watchdogs 306-308, as appropriate, information regarding the instance (s) of the project definition which have just been launched, and which the watchdog(s) will need to monitor. In this regard, the watchdogs 306-308 will already be running, but are initialized with information specific to the new project definition, so that each watchdog monitoring an imaging server that is executing an instance of the project definition will be fully aware of all project definitions that are being executed by that imaging server. From block 372, control returns to block 361, to handle the next successive request in the queue.

As evident from the foregoing discussion, the embodiment of FIG. 9 has the imaging server modules 247 located in respective processors 241 which are each separate from the processor 277 that executes the load balancing module 309. Alternatively, however, it would be possible for the system 201 to include an additional imaging server module 247 which is executed by the processor 277. In other words, the processor 277 would simultaneously execute both the load balancing module 309 and an imaging server module 247.

In order to understand the watchdog programs 306-308, it is helpful to first understand certain characteristics of the imaging server module 247 in each of the imaging servers 221-223. Many computer programs are developed for situations in which the execution of the program is terminated at the end of each workday, and is then re-started at the beginning of the next workday. Minor problems may sometimes slowly develop as such a program is executed, but then disappear when execution is terminated and restarted. This type of problem is typically due to a minor error which is not noticeable when the program is restarted frequently, for example on a daily basis, and which has thus not previously been identified and fixed. However, if the same program is shifted to a different operational situation where it is run for long periods of time, such as weeks or months, then these errors can create serious problems.

For example, when the application program is done with a segment of memory and attempts to turn it back over to the operating system, the handoff back to the operating system may not be fully completed, such that each program thinks the other currently has control of the memory segment. This is one example of what is commonly known as memory leakage. It does not affect proper operation of either program, but does result in a progressively decreasing quantity of memory that is available for active use by executing programs. Where the system is powered down and re-started on a daily basis, the "lost" memory is recovered during the rebooting process, and may never become large enough during the course of a single day to noticeably affect the efficiency of the system. However, if the same system is run continuously for many months, the amount of lost memory could slowly and progressively increase over the course of several weeks to the point where the system was running very inefficiently, because it was being choked by a lack of sufficient memory.

Another type of problem which can occur is that, on rare occasion, something may take place that can cause the application program to lock up and/or cause the operating system to experience a "crash". Still another type of problem involves a situation where there is degradation in performance characteristics or activity response of the imaging server, for example where a project definition is executing and there is a progressive increase in the average amount of time needed to process successive images. The average time for the project definition to process an image might, for example, initially be one second per image but slowly degrade to ten seconds per image. Writing a program which can run for months at a time while reliably avoiding these types of problems can be very time consuming and extremely expensive.

In the disclosed embodiments, the imaging server modules 247 are expected to run continuously for many months at a time. In order to deal effectively and efficiently with potential problems of the type just discussed, the disclosed embodiments provide the watchdog programs 306-308 with the capability to monitor the imaging server modules 247 for various problems, such as a memory leakage problem similar to that discussed above. Each of the watchdog programs 306-308 has the capability to respond to detection of such a problem by automatically taking appropriate remedial action, as discussed below. The watchdog programs 306-308 are somewhat simpler than the imaging server modules 247, and it is much less expensive to write the watchdogs to meet a desired level of dependability and accuracy than to do so with the imaging server modules 247.

Figure 12:
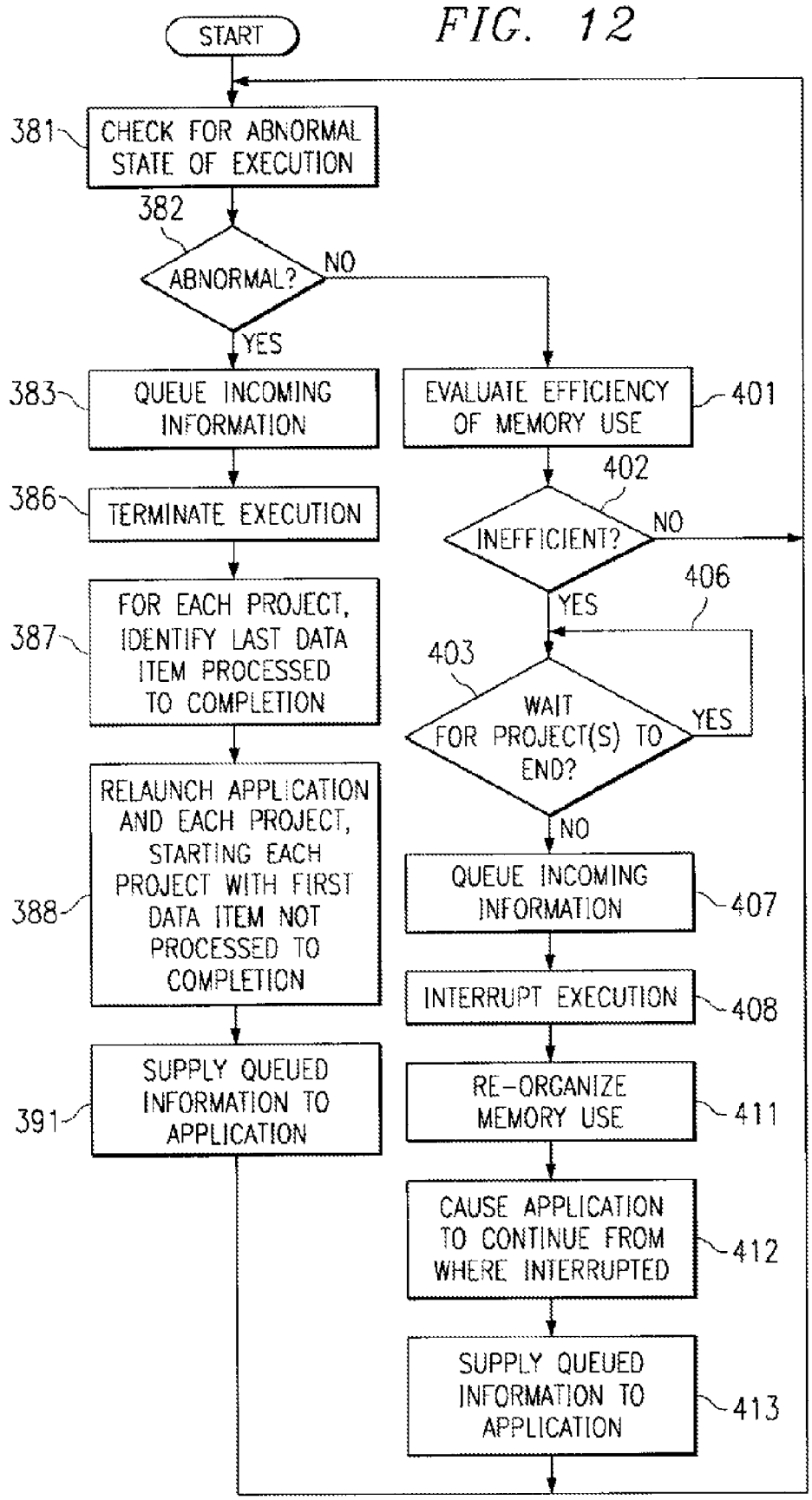

FIG. 12 is a flowchart showing a portion of the operations carried out by each of the watchdog programs 306-308. In more detail, each watchdog program checks at 382 to determine whether the associated imaging server has entered some abnormal state of execution, for example where its imaging server module 247 has locked up or its operating system 246 has crashed. This type of condition is to be distinguished from situations such as inefficient use of memory, where the imaging server continues operating properly, but progressively more slowly. If it is determined that execution is abnormal, then control proceeds from block 382 to block 383, where the watchdog program begins queuing incoming information. This is a queue within the associated watchdog program 306-308, which is separate from the queue 296. This internal queue ensures that incoming information for the problematic imaging server is not inadvertently lost while remedial action is being taken, which in this case will involve restarting the imaging server. Next, at block 386, execution of the imaging server module 247 and/or operating system 246 is terminated.

Thereafter, at block 387, each project definition which is under execution but which has not been fully completed is evaluated, including identification of the last item of data which was processed to completion and saved through a destination module. Thereafter, at block 388, programs within the imaging server are each restarted, including the operating system 246 and the imaging server module 247. Further, the task 251 or 252 for each project definition is reconfigured to the extent necessary to ensure that execution of the project definition will continue with the first data item after the one that was identified in block 387. Then, after the imaging server and its imaging server module 247 are up and running again, the queued input information is supplied at block 391 to the imaging server module 247. Control then returns from block 391 to block 381.

Returning to block 382, if the result of the determination here is that the monitored imaging server has not entered an abnormal state of execution, then control proceeds from block 382 to block 401, where the watchdog program 60 evaluates the efficiency of memory use by the imaging server that it monitors. If it determines that the efficiency of memory use is within acceptable bounds, then at block 402 control is routed back to block 381. Otherwise, control proceeds from block 402 to block 403, where the watchdog program determines whether it can wait for normal completion of the project definitions which are currently being executed by the monitored imaging server. If so, then the watchdog waits at 406 for execution of all such project definitions to end. Otherwise, or in due course, control will proceed from block 403 to block 407, where the watch dog program will initiate queuing of incoming information. If the imaging server was allowed to complete execution of all assigned project definitions at block 403, then there will typically be little or no incoming information to be queued. On the other hand, if it was necessary to take action prior to completion of a project definition, then there may be incoming information which needs to be queued.

Next, at block 407, the watchdog program interrupts execution of any project definitions that have not been completed. Then, at 411, the watchdog cooperates with the associated imaging server 221-223, in a manner which effects a reorganization of memory use. (If the memory use has become extremely inefficient, then it may be appropriate to restart the imaging server in a manner similar to that discussed above in association with blocks 383, 386-388 and 391, but this option is not expressly illustrated in the flowchart of FIG. 12). After memory use has been reorganized in block 411, the imaging server is instructed by the watchdog at block 412 to continue execution of interrupted project definitions from where each was interrupted. Then, at block 413, the queued input information is supplied to the imaging server. Control then returns to block 381.

Although the disclosed embodiments provide the watchdogs 306-308 with the capability to queue incoming information, for example as discussed above in association with blocks 383, 391, 407 and 413 of FIG. 12, an alternative approach could be used. In particular, if incoming information could not be immediately delivered to the appropriate imaging server 221-223, then the associated watchdog could return that information to its source, along with a message indicating that the imaging server was currently busy or unavailable.

Returning to FIG. 9, and as mentioned above, the Web server 207 interfaces the intranet 206 to the Internet 208. The Web server 207 executes an operating system 441, which in the disclosed embodiments is one of the versions of the 40 operating system available under the trade name WINDOWS. Running on the operating system 441 is a Web interface module program 442, which effects the appropriate interface between the intranet 206 and the Internet 208, in a known manner.

In the embodiment of FIG. 9, the workstations 211 and 226 are effectively identical, except for the fact that the workstation 211 is a local workstation coupled to the intranet 206, whereas the workstation 226 is at a remote location and is coupled to the intranet 206 through the Internet 208. Although only two workstations 211 and 226 are shown in FIG. 9, it will be recognized that the system 201 of FIG. 9 could include a large number of similar workstations. Since the illustrated workstations 211 and 226 are equivalent, only the workstation 211 is described below in detail.

The workstation 211 provides the capability for a person to create project definitions, to upload or "publish" project definitions and/or custom definitions to the process server 212, to download project definitions and/or custom definitions from the process server 212, and to effect execution of project definitions within the workstation or within one of the imaging servers 221-223 under control of the process server 212. The workstation 211 includes a processor 451 and a memory 452. The processor 451 is coupled to a cathode ray tube (CRT) display 456, in order to permit the workstation 211 to present information to a person. A keyboard 457 and a pointing device such as a mouse 458 are each coupled to the processor 451, to permit a person to provide input to the workstation 211.

Stored within the memory 452 are a plurality of standard definitions 461, including all of the definitions set forth in Tables 1-4. The standard definitions at 461 include not only the executable object code for each definition, but also a separate file which contains the corresponding source code. In the disclosed embodiments, the source code for each standard definition is expressed in a language known as VISUAL BASIC, which was developed by Microsoft Corporation of Redmond, Wash.

As mentioned above, the present invention does not restrict the user to the standard definitions shown in Tables 1-4, but instead gives the user the capability to create additional definitions called custom definitions. To the extent that any custom definitions have been created locally within the workstation 211, or have been uploaded to the workstation 211 from the process server 212, they are stored at 462 in the memory 452. The custom definitions stored at 462 include not only object code files, but also corresponding source code files for custom definitions that were created locally. One convenient technique for creating a custom definition is to take source code for one of the standard definitions 461, modify the source code as appropriate, and compile the modified source code to create a corresponding object code file, and then store the modified source code file and associated object code file at 462.

As mentioned above, the workstation 211 can be used to create project definitions, which are then stored at 463 in the memory 452, and can optionally be uploaded to the process server 212, along with any associated custom definitions. Project definitions from the process server 212 can be downloaded and stored at 463, with any associated custom definitions being simultaneously downloaded and stored at 462. Further, the workstation 211 can be used to modify existing project definitions that are stored locally at 463, whether they were created locally or downloaded from the process server 212. The manner in which project definitions and/or custom definitions and be created and/or modified are discussed below.

In this regard, the processor 451 executes an operating system 471, which in the disclosed embodiments is one of the versions of the operating system available under the tradename WINDOWS. A user at the workstation 211 may optionally use the operating system 471 to run a program development environment 472, which in the disclosed embodiments is a program commercially available under the trade name VISUAL BASIC from Microsoft Corporation. The development environment 472 is used to create custom definitions, typically by retrieving the source code for a standard definition from 461, making desired modifications to this source code within the development environment, storing the modified source code at 462, compiling the modified source code within the development environment, and then storing at 462 the object code which results from the compilation. The program 472 does not interact with any other application program within the workstation 211, or with programs in other parts of the system. Thus, in the disclosed embodiments, creation of a custom definition using the program 472 is effectively an offline procedure.

The workstation 211 also executes a standard email program 473, which has the capability to send and receive emails in a known manner. Thus, for example, if a person has used the workstation 211 to initiate execution of a project definition within one of the imaging servers 221-223, and if that project definition includes a Send Email module (TABLE 3), execution of the Send Email module will cause an email to be sent to the email program 473 in the workstation 211. This can provide the user of the workstation 211 with appropriate information, such as notice that execution of a project definition has been completed by one of the imaging servers 221-223.

A standard network browser program 473 also runs on the operating system 471 in the processor 451. A person using the workstation 211 may use the browser 476 to link to a Web site provided by the Web site program 314 in the process server 212, for example to present a request for execution of one of the project definitions stored at 286 in the memory 278. Further, while that project definition is being executed in one of the imaging servers 221-223, the project definition may interact with the person at workstation 211 through the Web site at 314 and the browser 476. Alternatively, through use of the browser program 476, the workstation 211 may request execution of a project definition which was created at the other workstation 226 by another user, and which was then uploaded to the process server with an indication that it would be accessible to other users. The browser program 476 and the Web site 314 interact with each other using a public communication protocol conforming to standards for the portion of the Internet known as the World Wide Web (WWW), such as the XML protocol or the HTTP protocol.

Figure 13:
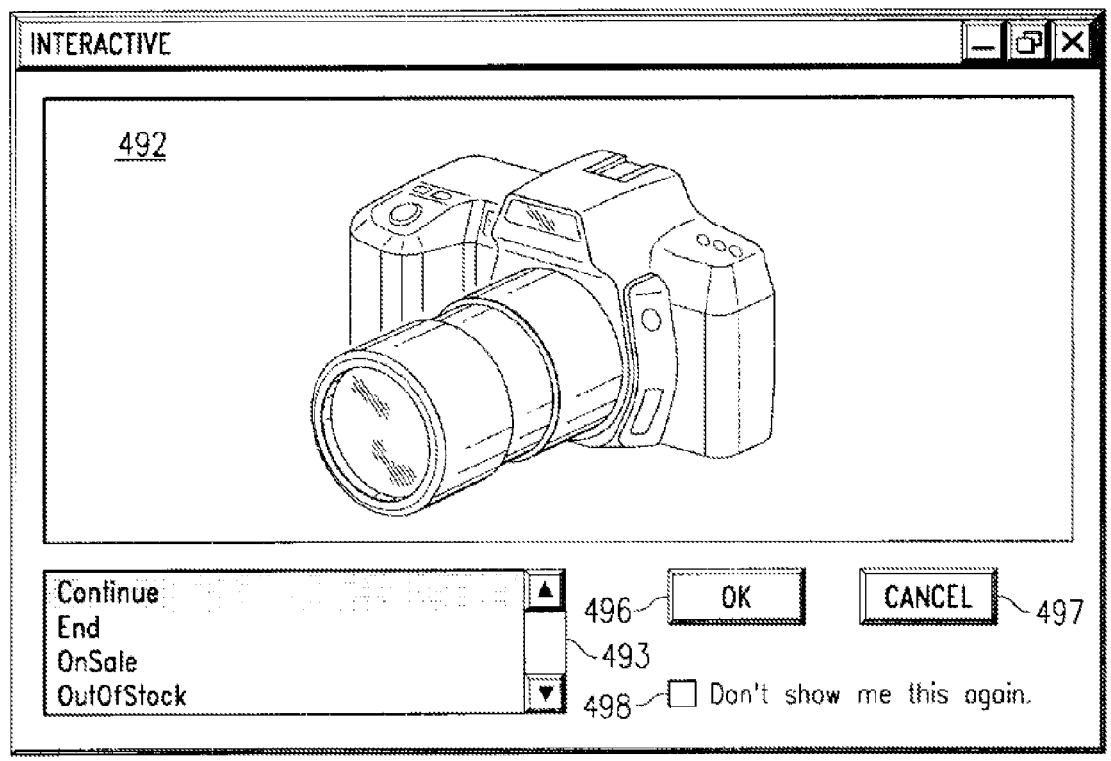
FIG. 13 is a diagrammatic view of a dialog box which can be displayed by the system of FIG. 9 during execution of a project definition.

In particular, as one specific example, it was explained above that the Interactive module 146 of FIG. 8 pauses execution of the project definition 101 to request user input. FIG. 13 is a diagrammatic view of an example of a window 30 or dialog box that might be configured as a Web page in the Web site 314, and displayed on the display 456 of the workstation 211 through the browser 476. The dialog box 491 includes a portion 492 which displays the image that is currently in the interactive module of the project definition. It also includes a list box 493 containing several options. In FIG. 13, the options include "Continue", which would cause execution to continue along the current main process or sub-process, "OnSale", which is one sub-process to which a branch can be effected, "OutOfStock", which is a second sub-process to which a branch can be effected, and "End", which will completely terminate execution of the project definition that contains the interactive module. Using the keyboard 457 and/or the mouse 458, the user can select one of the items in the list box 493, and then click an "OK" 45 button 496 in order to cause the selected option to be implemented. Instead of clicking the "OK" button 496, the user could alternatively click a "Cancel" button 497, which has the same effect as clicking the "OK" button 496 while the "End" option is selected in list box 493.

Before clicking the "OK" button 496, the user has the option to click a "Don't show me this again" box 498, so as to toggle a check mark on or off in the box 498. If the check mark is present when the "OK" button is clicked, then the project definition will not pause and display the window 491 each time the Interactive module is thereafter encountered during the current execution of the project definition. Instead, the option in list box 493 which is currently selected will thereafter be automatically used for every subsequent execution of that particular Interactive module.

An author module program 477 and/or another program 478 may also be running on the operating system 471 in the processor 451. The author module 477 is discussed in more detail below, and may be used to create, modify, upload, download, and execute project definitions. The other application program 478 is shown in FIG. 9 to emphasize that some or all functions of the author module 477 could alternatively be implemented by some other application program. For example, the author module has the capability to create a new project definition, which includes the capability to express the project definition in an XML format comparable to the example shown in TABLE 5. However, it is possible that some other application program, such as the program 478, could also prepare a project definition in this XML format. Similarly, the program 478 might have the capability to generate and send a request for execution of one of the project definitions 286 stored in the memory 278, and may have the capability to express this request in a public communication protocol such as XML. The program 478 may communicate with the process server 212 through the network interface program 312.

Figure 14:
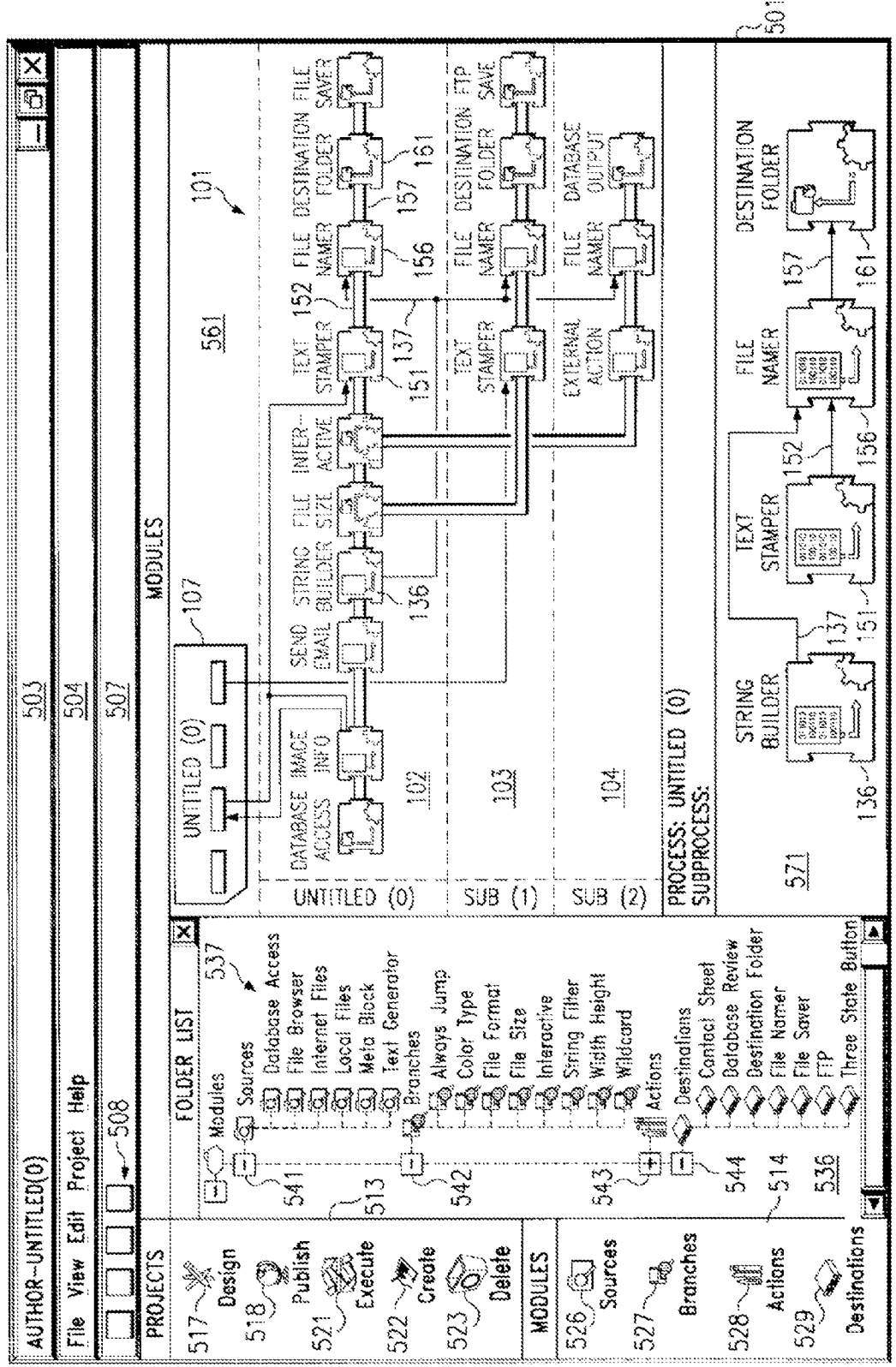
FIG. 14 is a diagrammatic view of a screen which can be displayed by the system of FIG. 9 to permit a user to carry out functions such as creation, modification and execution of a project definition.

Turning now in more detail to the author module 477, FIG. 14 is a diagrammatic view of a typical screen which the author module 477 might present on the display 456 in order to permit a user to create or modify a project definition, or to perform related functions. At the left side of the screen is a vertical column which includes a projects area 513 and a modules area 514. The projects area 513 includes a "design" icon 517, a "publish" icon 518, an "execute" icon 521, a "create" icon 522, and a "delete" icon 523. The design icon 517 is used to initiate modification of a project definition which is already open. The publish icon 518 is used to transfer to the process server 212 a selected project definition in an XML format comparable to FIG. 5, along with the object code for any custom definitions that are used by that project definition.

The execute icon 521 permits the user to initiate execution of a specified project definition. This may be a project definition stored within the memory 278 of process server 212, in which case the author module generates and sends to the process server 212 a request for execution of the project definition. In the disclosed embodiments, the request is expressed in a public communication protocol, such as the XML protocol. If the project definition to be executed is stored locally, the user can control whether that project definition is to be executed locally within the workstation 211, or sent to the process server 212 so that it can be executed in one of the imaging servers 221-223. If it is to be sent to the process server, then the author module generates and sends a request in the same basic manner just described, except that the XML definition of the project definition, along with object code for any custom definitions used by that project definition, are transmitted with the request.

With respect to local execution of a project definition, the author module 477 has essentially the same capabilities as the imaging servers 221-223, with one exception. The author module 477 in the disclosed embodiments has been developed with the expectation that it may be distributed at a reduced price or even free of charge, in order to encourage development of project definitions through use of the author module 477. In conjunction with this, the author module 477 in the disclosed embodiments has been designed so that, during each execution of any project definition, it will process no more than five items of data, such as five images. This permits a user to carry out limited execution for the purpose of testing a new project definition, but does not permit the user to process a large quantity of data. In order to process a large quantity of data, the user is expected to instruct the process server 212 to have an imaging server 221-223 carry out the execution of the project definition, for which the user will be charged a fee by the process server 212.

The author module 477 could alternatively be configured to have full capability in all respects to execute project definitions, including the capability to process any number of items of data. However, such a version of the author module would likely be sold for a much higher price, which could involve significantly greater overall expense for some infrequent users.

In FIG. 14, the create icon 522 is used to initiate creation of a new project definition. This includes creation of a new XML file of the type shown in TABLE 5, which will be progressively expanded as the project definition is created. The delete icon 523 permits a user to delete a selected project definition which is stored locally at 463. It does not permit the user to delete a project definition which is stored in the process server 212.

The modules area 514 of the screen 501 includes a "sources" icon 526, a "branches" 527, an "actions" icon 528 and a "destination" icon 529. It will be noted that these four icons each correspond to a respective one of the types of modules that were discussed above in association with FIG. 1. The purpose and operation of the icons 526-529 will be discussed later.

To the right of the column containing areas 513 and 514 is a further column 536, which contains a list, in a standard tree format 537, of available source, branch, action and destination definitions. In this regard, the tree 537 includes nodes 541-544 adjacent each category of definitions. Each node 541-544 can be clicked to expand or contract the amount of information shown for that category. For example, in FIG. 14 the "sources" category is expanded, and lists various specific source definitions which are available for use in creating a project definition. In contrast, the "actions" category is contracted, and shows a subheading but does not specifically list each of the action definitions which are available.

The previously-mentioned icons 526-529 in the area 514 of the screen 501 can be used to expedite the expansion and contraction process. For example, if the sources icon 526 is clicked, the sources category of the tree 537 will be expanded, while each of the other three categories will be simultaneously contracted. Similarly, if the branches icon 527 is clicked, the branches category in the tree 537 will be expanded, whereas the sources, actions and destination categories will all be contracted. The actions icon 528 and the destinations icon 529 each operate in a comparable manner.

In the center right portion of the screen 501 is a process view area 561, where one process of a project definition can be displayed. For the sake of example, the process view area 561 of FIG. 14 is presenting the project definition 101 that was discussed above in association with FIG. 8. If a process was so big that the entire process could not be conveniently shown all at once in the process view area 561, a portion could be shown, and standard scroll bars could be provided along the bottom and right sides of the area 561, so that the user could scroll to other portions of the process. The process view area 561 in FIG. 14 includes broken lines defining several horizontal strips that respectively contain the global portion 107, the main process 102, the subprocess 103 and the subprocess 104. Although broken lines are used in FIG. 14, the horizontal strips could alternatively be delimited by light solid lines and/or lines of a selected color, or could be identified by the use of a different background color for each strip.

In order to add a module to a process shown in the process view area 562, a user can use a pointing device such as the mouse 458 to select the desired type of module in the tree 537. Then, the user can use the mouse to indicate where to the module in the process, for example by clicking at the location where the new module is to be inserted. Binding of the new module to other modules can then be effected in a manner described later.

As discussed above, the main process 102 and the subprocesses 103 and 104 collectively define a single overall process. The title of the overall process appears in the global process portion 107, and in this case is a default title of "Untitled(O)", because the process has not yet been given a specific name. Within this process, the main process 102 and sub-processes 103 and 104 may each be given a unique name, and these names are displayed at the left side of the project view area 561. In the depicted example, default titles are shown, which are "Untitled(O)", "Sub(1)" and "Sub(2)".

In the lower right portion of the screen 501 is a binding view area 571. A user is permitted to select one of the modules shown in the process view area 561. That selected module will then be displayed in the binding view area 571, along with each module to which it is bound, with all of the binding lines which extend between the illustrated modules. All other modules and binding lines will be omitted. In the specific example shown in FIG. 14, the user selected the File Namer module 156 in the process view area 561. Consequently, the File Namer module 156 appears in the binding view area 571, along with each of the binding lines 137, 152 and 157 relating to it, as well as each of the other modules 136, 151 and 161 that are associated with those binding lines. All other modules and binding lines are omitted from the binding view area 571.

Figure 15:
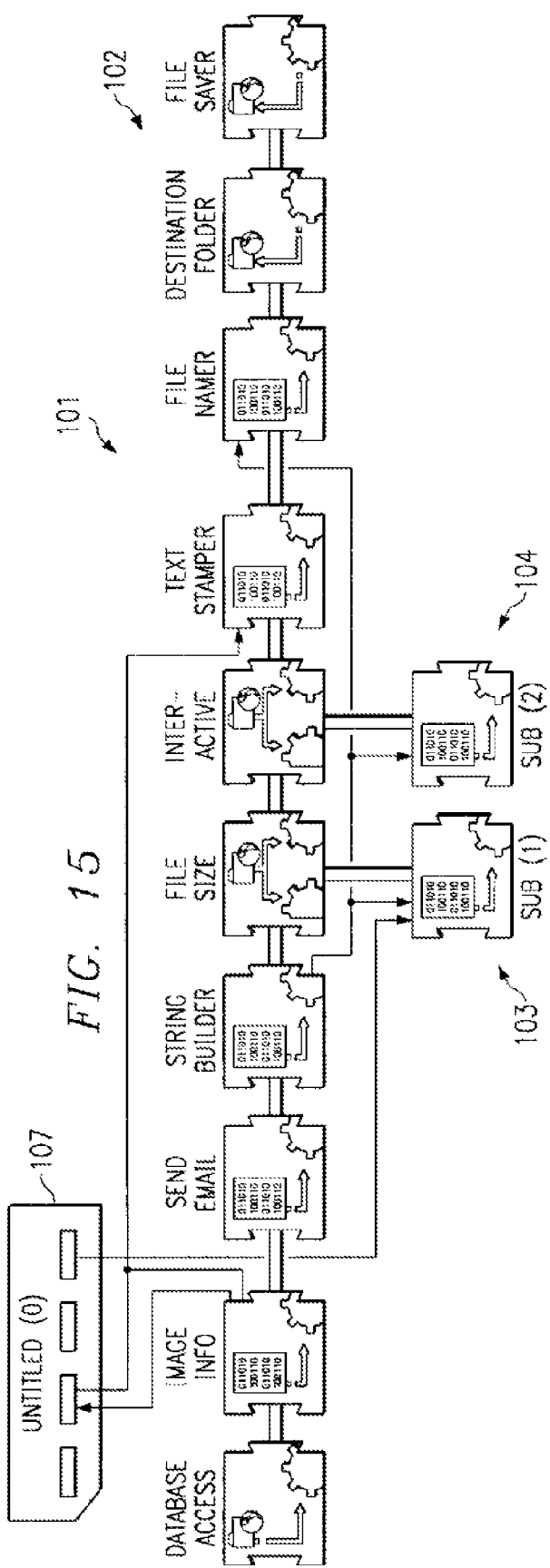
FIG. 15 is a diagrammatic view of a which the project definition of FIG. 8 represented.

The author module 477 provides the user with the capability to selectively display the project definition 101 in different forms within the process view area 561. One such alternative form is shown in FIG. 15, where it will be noted that only the main process 102 is shown in complete detail. Each of the sub-processes 103 and 104 is represented by only a single block. In the case of a relatively complex process, this permits a portion of interest to be more easily viewed.

Figure 16:
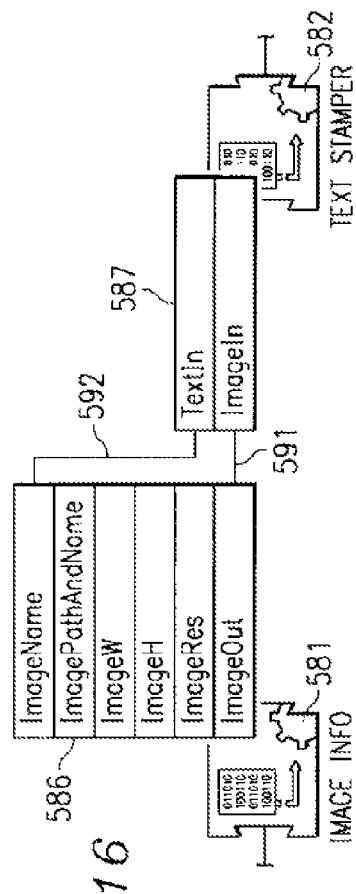
FIG. 16 is a diagrammatic view of two modules of a project definition, in conjunction with binding menus that are used to define a relationship between the depicted modules.

Another capability of the author module 477 is to permit a user to create and modify binding definitions in a graphical manner, for example through use of a pointing device such as the mouse 458 (FIG. 9). In this regard, FIG. 16 is a diagrammatic view of a portion of a process as it might appear in the binding view area 571 of the screen 501 of FIG. 14. This example includes an Image Info module 581, and a Text Stamper module 582. In order to create two bindings between these two modules, a user has brought up for each module a display of a respective binding menu 586 or 587. The binding menu 586 lists each of the output ports of the Image Info module 581, and the user has invoked its display by using the pointing device to place the cursor over the right portion of the module 581, and by then rightclicking. The binding menu 587 lists the input ports of the text stamper module 582, and its display has been invoked by using the pointing device to place the cursor over the left portion of the module 582, and by then right clicking.

Two binding lines 591 and 592 each extend between a respective entry in the menu 586 and a respective entry in the menu 587. The binding line 591 corresponds to image data, and links the "ImageOut" output port of the Image Info module 581 to the "ImageIn" input port of the Text Stamper module 582. Similarly, the binding line 592 links the "ImageName" output port of module 581 to the "TextIn" input port of the module 582. Each of these binding lines was created by clicking on an output port in one menu and then clicking on an input port in the other menu, or by clicking on an input port and then an output port. One end of a binding line may be changed from one output port to another output port by clicking and dragging that end of the binding line from its current output port to the new output port, which may be in the same menu or in a different menu. A binding line can be deleted by clicking and dragging one end to a point spaced from any of the binding menus.

It will be recognized that, in general, a given module cannot execute properly if an input port of that module has been bound to an output port of another module which does not have valid data at a time when the given module needs to be executed. For example, it would not be appropriate for the first module in a sub-process to have an input port which is bound to an output port of another module that is disposed later in the same sub-process. Consequently, the author module 477 will reject such an invalid binding if a user attempts to create one in a project definition, and will display for the user a suitable explanatory message as to why the binding cannot be accepted.

As discussed above, the development environment program 472 is essentially used in an off-line manner with respect to other programs shown in FIG. 9, in that it is executed separately and independently and does not interact with any of the other programs. Alternatively, however, the program 472 could be omitted in favour of a different form of development environment program that could be integrated into the author module 477, where its functionality would always be readily available while the author module was executing, without any need to separately start it. One suitable example of such a development environment program is a program that is commercially available from Microsoft Corporation under the trade name VISUAL BASIC FOR APPLICATIONS.

As discussed above in association with the binding line 128 of FIG. 8, the present invention contemplates conditional binding lines, which can associate a given input port with a selected one of two or more output ports, based on a specified condition. Moreover, as also discussed above, the condition is effectively associated with the binding line, rather than with any of the specific modules that have input and output ports associated by the binding line. In order to define or change the condition associated with a conditional binding, a dialog box is presented to the user, for example by superimposing it on a portion of the screen 501 of FIG. 14. An example of such a dialog box is shown at 601 in FIG. 17. One way to invoke the display of the dialog box 601 is to right click on a conditional binding line in the binding view area 571 of the screen 501.

Figure 17:
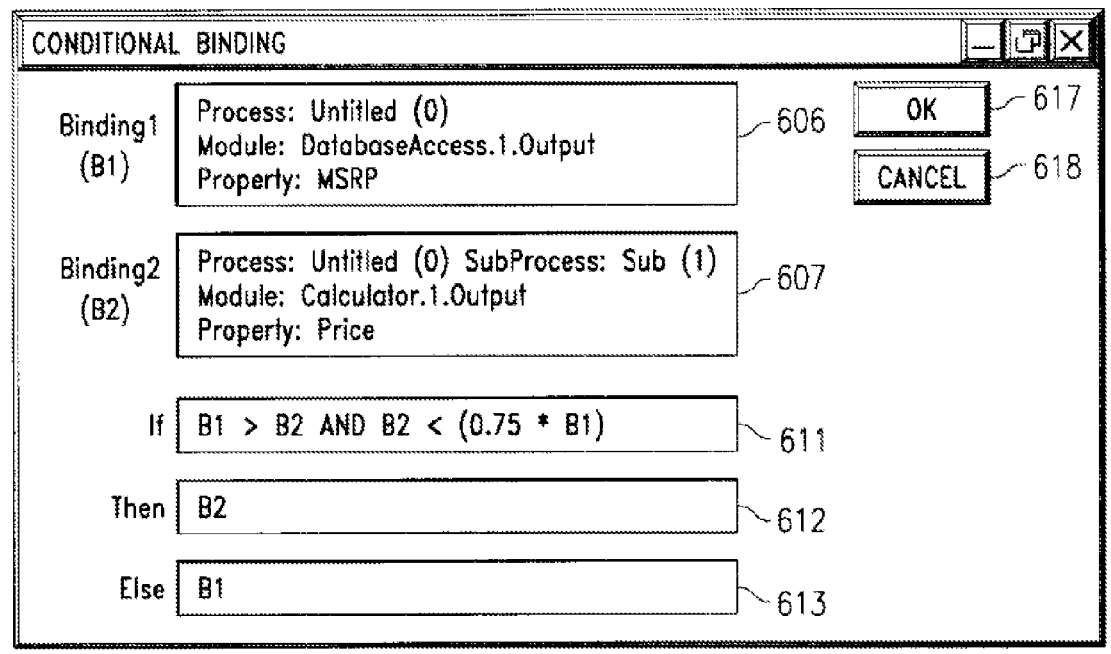
FIG. 17 is a diagrammatic view of a further dialog box, which can be displayed by the system of FIG. 9 during creation of a project definition.

In FIG. 17, the dialog box 601 relates to a conditional binding which associates an input port with one of two different output ports. The dialog box 601 includes two areas 606 and 607, which each identify a respective one of these two output ports. If this conditional binding had the capability to associate the input port with more than two output ports, then the dialog box 601 would include for each such output port a respective area similar to the areas 606 and 607. The areas 606 and 607 each identify the associated output port by setting forth the name of the process in which that output port is disposed, the name of a sub-process if the output port is not in the main process, the name of a particular module within that process, including its instance number (as discussed above in association with TABLE 5), and the word "Output" to indicate that the port in question is an output port. Finally, each area identifies any name associated with the particular output port. In the case of area 106, this name is "MSRP", which stands for Manufacturer's Suggested Retail Price, because the data in question is a representation of a price. In the case of area 607, this name is "Price", and indicates that the data at the indicated output port represents a price. For convenience, the dialog box 601 gives each of these two output ports a shorthand label. In the illustrated example, these shorthand labels are "B1" and "B2", and appear immediately to the left of the areas 606 and 607.

In the lower portion of the dialog box 601 are three areas 611-613 which are used to set the actual condition. In particular, area 611 is used to enter an equation which can include a combination of Boolean and algebraic terms. Area 612 is used to specify which output port will be associated with the input port if the condition specified in area 611 is true. Area 613 specifies which output port will be coupled to the input port if the condition specified in area 611 is false.

The dialog box 601 also includes an "OK" button 617, which can be clicked to close the dialog box 601 and set the conditional binding to operate according to the information which is currently set forth in the dialog box. In addition, there is a "Cancel" button 618, which can be clicked to close the dialog box 601 without making any change to the pre-existing state of the conditional binding.

As discussed above, the example of an XML project definition set forth in TABLE 5 includes at lines 44-108 a Text Stamper module, of which lines 46-99 define a number of parameters that control various characteristics of the text which is superimposed onto an image by the Text Stamper module. These parameters are specified by a user who is creating a project definition, at the time that the Text Stamper module is added to the project definition. The user also has the capability to subsequently adjust these parameters. In order to set or adjust these parameters, the user is presented with a dialog box, an example of which is shown at 651 in FIG. 18. The dialog box 651 will be automatically presented when the Text Stamper module is initially being added to the project definition. Thereafter, if a user wishes to modify the settings, the user can invoke the display of the dialog box 651, for example by using a pointing device to right-click on the center of the module. When opened, the dialog box 651 may, for example, be superimposed over a portion of the screen 501 shown in FIG. 14. The information shown in the dialog box of FIG. 18 corresponds directly to the parametric control information set forth at lines 46-99 in TABLE 5, as discussed below.

Figure 18:
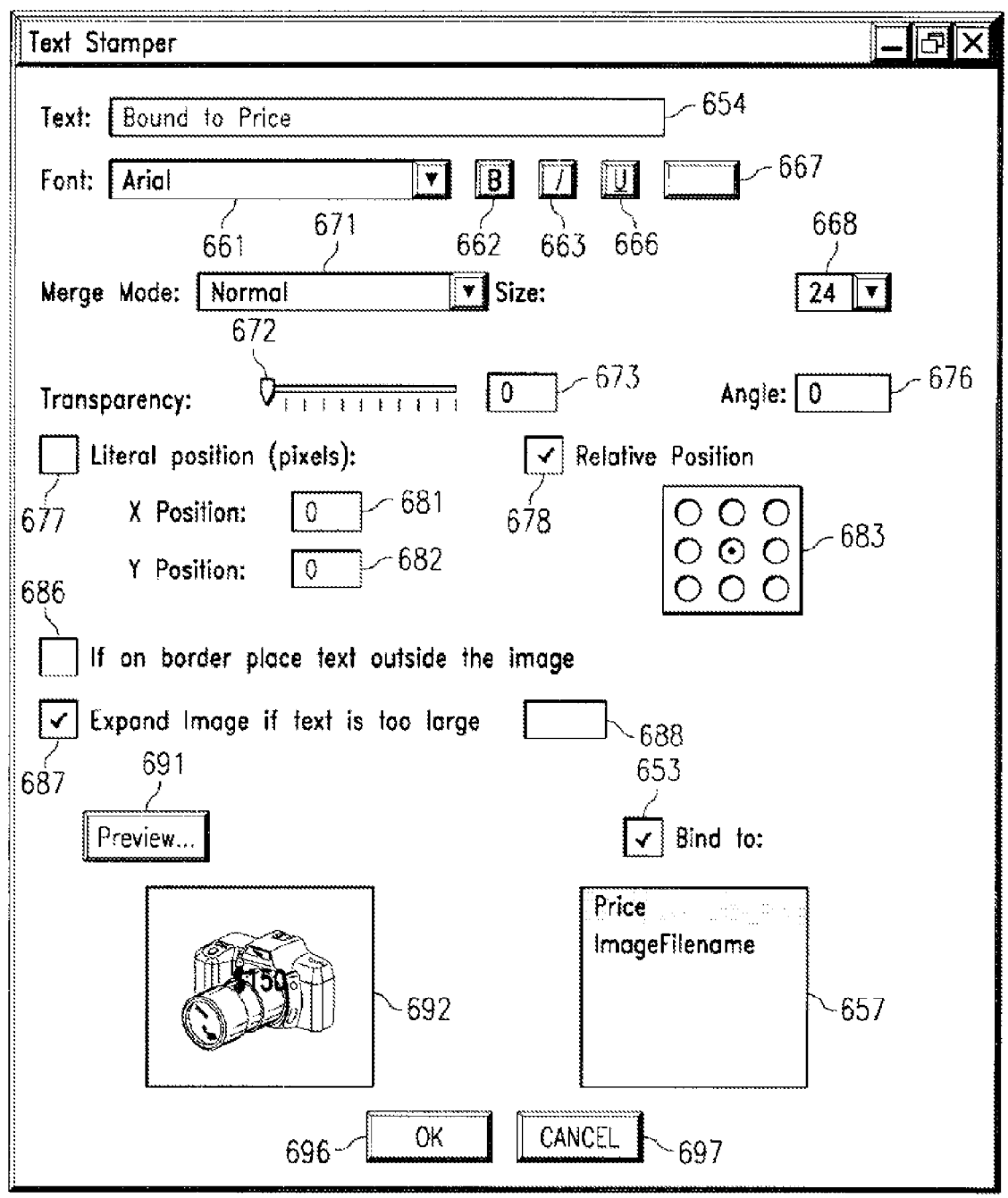
FIG. 18 is a diagrammatic view of yet another dialog box, which can be displayed by the system of FIG. 9 during creation of a project definition.

In this regard, the user has two ways in which to obtain the text which is to be stamped on the image. First, the text can be defined internally to the Text Stamper module as a literal string, in which case the text does not change during execution of the project definition. Alternatively, the text can be obtained from an output port of another module, in which case it is possible for the text to change during execution of the project definition, such that each processed image has different text superimposed on it. The selection of one of these approaches is controlled by the setting of a "Bind to" box 653 disposed within the dialog box 651. If there is no check mark in the box 653, then the text string is configured as an internal literal string, which is specified in a box 654. In the example of FIG. 18, however, there is a check mark in the box 653, as a result of which the box 654 is effectively ignored. The box 654 simply includes a grayed-out string "Bound to Price", which is an indication to the user that the text is being obtained externally from an output port named "Price".

Since there is a check mark in the box 653, the text string to be superimposed on the image is to be obtained from an output port of another module. Therefore, available output ports are listed in a box 657, and the user highlights one of them in order to select it. In the illustrated example, the "Price" output of another module has been highlighted in order to select it. In the XML definition of TABLE 5, lines 61-63 define a "Bound" parameter which indicates whether the box 653 contains a checkmark, and lines 73-75 indicate the particular output port which the user has selected in box 657. Since the text box 654 is not used in the illustrated example, the XML definition in TABLE 5 does not include an entry corresponding to box 654, but it would include such an entry if there was no checkmark in box 653. Alternatively, the XML definition in TABLE 5 could include such an entry for box 654, even though there is a checkmark in box 653.

In addition to defining what text to use, the dialog box 651 permits certain characteristics of the appearance of the text to be controlled. In this regard, box 661 permits selection of a font, and corresponds to lines 91-93 in TABLE 5. Button 662 specifies whether or not the text is to be in a bold font and corresponds to lines 52-54 in TABLE 5. Button 663 indicates whether the font is to be presented in regular or italics style, and corresponds to lines 97-99 of TABLE 5. Button 666 controls whether or not the text is to be underlined, and corresponds to lines 70-72 in TABLE 5. The color of the text can be selected using button 667, which calls up a not-illustrated dialog box that offers a choice of colors. After selection of a color, that color is displayed on the face of button 667. Button 667 corresponds to lines 79-81 of TABLE 5. The size of the font can be selected at 668, which corresponds to lines 58-60 of TABLE 5.

A merge mode can be selected at 671, which corresponds to lines 67-69 in TABLE 5. This permits control over the combination or mixture of colors in an image, using additive or subtractive color theory. In this regard, an image can be selectively changed according to hue, saturation or lightness, and modifications can be made to the red, green or blue channel of an image. The manner in which the superimposed text is associated with the image, or in other words a merge mode, is selected at 671, which corresponds to lines 67-69 in TABLE 5. The degree of transparency of the superimposed text can be adjusted on a scale from 0 to 100 using a simulated slide control 672 that can be dragged by a mouse, where a numeric value for the current setting is displayed at 673. A value of 0 means that the text is opaque, whereas a value of 100 means that the text is completely invisible. Lines 55-57 of TABLE 5 correspond to the transparency setting.

The dialog box 651 also provides the capability to control the positional relationship between the superimposed text and the image. In this regard, the text can be placed at a selected angle with respect to the image by entering an appropriate value in degrees in box 676, ranging from 0 to 360. Box 676 corresponds to lines 88-90 in TABLE 5. The user can select one of two different ways to specify the position of the text relative to the image, by checking one of two boxes 677 and 678. Only one of these boxes can be checked, and placing a check mark in one removes the check mark from the other. Lines 94-96 of TABLE 5 contain a value indicating which of the boxes 677 and 678 has been checked.

If the box 677 is checked, then the position of the text is defined on a precise basis using a Cartesian coordinate system, based on a count of pixels within the image. The "X" position value is specified in a box 681, and the "Y" value is specified in a box 682. The boxes 681 and 682 respectively correspond to lines 49-51 and lines 85-87 in TABLE 5. Alternatively, if the box 678 is checked, then the user can set the position more rapidly but less accurately, in particular by selecting one of nine "radio" buttons disposed within a box 683. In the example of FIG. 18, the center radio button has been selected, to indicate that the text is to be centered in both the X and Y directions within the image. 5 The box 683 corresponds to lines 82-84 in TABLE 5.

If text reaches the border of the image, the user has the option of deciding whether to place text outside the image. This is controlled by whether or not the user places a check mark in a box 686. The box 686 corresponds to lines 64-66 of TABLE 5. A further option is that, if the text is too large in relation to the image, the user has the option of indicating whether the size of the image should be expanded. This is controlled by whether or not the user places a check mark in a box 687, which corresponds to lines 76-78 in TABLE 5. If box 687 is checked, and if the image is therefore expanded, the expansion will occur through the addition of pixels at one or more edges of the image. The color for these additional pixels needs to be defined, and this is controlled by a button 688. Like the button 667, the button 688 calls up 20 a further dialog box which permits the selection of a color. Once a color has been selected, the face of the button 688 is thereafter displayed in that color. Button 688 corresponds to lines 46-48 of TABLE 5.

It is frequently helpful to a user to be able to see a sample of how the text might appear on an image, based on the current settings of the various parameters that can be set using dialog box 651 in the manner described above. Accordingly, the user can click a preview button 691, which causes a display at 692 of a sample image with sample text superimposed on it in a manner conforming to the current parameter settings in box 651. In the example of FIG. 18, the sample image is a camera, and the sample text is "$150". The preview image in box 692 is not actual data or actual text which would be used during execution of the project 35 definition, because the project definition is not currently being executed.

When the user is satisfied with all of the settings in dialog box 651, the user can click an "OK" button 696, which causes the current information in the dialog box 651 to be converted into XML form and saved within the associated project definition. Alternatively, the user can click a "Cancel" button 697, causing all of the information in the dialog box 651 to be discarded without any change to the XML definition of the project definition. Clicking either of the buttons 696 or 697 causes the dialog box 651 to be closed.

The present invention provides a number of technical advantages. One such advantage results from the capability to launch multiple instances of the execution of a given project definition, where each instance is assigned a respective, mutually exclusive portion of the data from the data set that is to be processed. A further advantage results from the provision of two or more process servers which can each execute one or more instances of the same or different project definitions.

Given that there is a degree of idle time in the execution of many project definitions, for example while data is obtained or stored, both of these provisions for scalability help to optimize the use of processor time, and thus increase data throughput in an efficient and cost-effective manner. This is particularly advantageous where execution of many project definitions is carried out in the context of a centralized processing facility. Further, given that the capabilities for scalability are entirely automated, persons with limited computer skills can carry responsibility for the execution of project definitions in a manner which is efficient and cost effective.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method, comprising the steps of:
   providing a set of predetermined function definitions which are different, at least one of said predetermined function definitions defining a function for editing image data;
   storing a project definition that is operable when executed to edit said image data and which includes:
      a plurality of function portions which each correspond to one of said function definitions in said set, and which each define at least one input port and at least one output port that are functionally related according to the corresponding function definition, at least one of said plurality of function portions comprising a user-defined custom definition function portion associated with said project definition; and
      a further portion which includes a source portion identifying a data source and defining an output port through which said image data from the data source can be produced, and which includes a destination portion identifying a data destination and defining an input port through which said image data can be supplied to the data destination;
   binding information which includes binding portions that each associate a respective said input port with one of said output ports;
   executing said project definition;
   automatically transmitting a communication to a remote device through a communication link after editing said image data during execution of said project definition,
   wherein transmitting said communication occurs after editing a predetermined number of images; and
   causing the edited image data to be stored on a server that is publicly accessible via the Internet.

2. A method according to claim 1, including the step of carrying out said transmitting step as said executing step is completing.

3. A method according to claim 1, including the step of formatting said communication as an electronic mail message.

4. A method according to claim 1, including the step of configuring said communications link to include a network.

5. A method according to claim 4, including the step of configuring said network to include a portion of the Internet.

6. A method according to claim 1, wherein said transmitting step includes the step of causing one of said function portions to send the communication.

7. A method according to claim 1, wherein said communication identifies an occurrence of a predefined condition.

8. A method according to claim 1, wherein at least one of said plurality of function portions comprises an external action function portion.

9. A method according to claim 8, wherein said external action function portion provides an image and a command to an external image processing application for processing.

10. A method according to claim 1, wherein at least one of said plurality of function portions comprises an interactive function portion configured to pause execution of the project definition.

11. A method according to claim 1, wherein said operation of executing said project definition is configured to process image data corresponding to a plurality of images to adjust characteristics of said images so as to bring them into general conformity with each other.

12. One or more non-transitory computer-readable storage media storing computer-readable instructions for execution by a processor to perform a method which recognizes a set of predetermined function definitions that are different, at least one of said predetermined function definitions defining a function for editing image data, the method comprising:
   storing of a project definition that is operable when executed to edit said image data and which includes:
      a plurality of function portions which each correspond to one of said function definitions in said set, and which each define at least one input port and at least one output port that are functionally related according to the corresponding function definition, at least one of said plurality of function portions comprising a user-defined custom definition function portion associated with said project definition; and a further portion which includes a source portion identifying a data source and defining an output port through which said image data from the data source can be produced, and which includes a destination portion identifying a data destination and defining an input port through which said image data can be supplied to the data destination;

binding information which includes binding portions that each associate a respective said input port with one of said output ports;

execution of said project definition;

automatic transmission of a communication to a remote device through a communication link after editing said image data during execution of said project definition, wherein transmission of said communication occurs after editing a predetermined number of images; and causing the edited image data to be stored on a server that is publicly accessible via the Internet.

13. A computer-readable storage media according to claim 12, wherein said program is operable when executed to effect said transmission of said communication as the execution of said project definition is completing.

14. A computer-readable storage media according to claim 12, wherein said program is operable when executed to format said communication as an electronic mail message.

15. A computer-readable storage media according to claim 12, wherein said program is operable when executed to cause one of said function portions to effect said transmission of said communication.

16. A computer-readable storage media according to claim 12, wherein said communication identifies an occurrence of a predefined condition.

17. A method, comprising the steps of:

providing a set of predetermined function definitions, at least one of said predetermined function definitions defining a function for editing image data;

storing a project definition that is operable when executed to edit said image data and which includes:

a plurality of function portions which each correspond to one of said function definitions in said set, and which each define at least one input port and at least one output port that are functionally related according to the corresponding function definition; and a further portion which includes: a source portion identifying a data source and defining an output port through which said image data from the data source can be produced, and a destination portion identifying a data destination and defining an input port through which said image data can be supplied to the data destination;

binding information which includes binding portions that each associate a respective said input port with one of said output ports;

executing said project definition, wherein said project definition is configured to process image data corresponding to a plurality of images to adjust characteristics of said images so as to bring them into general conformity with each other; and causing the processed image data to be stored on a server that is publicly accessible via the Internet.

18. A method according to claim 17, further comprising automatically transmitting a communication to a remote device through a communication link after editing said image data during execution of said project definition, wherein transmitting said communication occurs after editing a predetermined number of images.

19. One or more non-transitory computer-readable storage media storing computer-readable instructions for execution by a processor to perform a method which recognizes a set of predetermined function definitions that are different, at least one of said predetermined function definitions defining a function for editing image data, the method comprising:

providing a set of predetermined function definitions, at least one of said predetermined function definitions defining a function for editing image data;

storing a project definition that is operable when executed to edit said image data and which includes:

a plurality of function portions which each correspond to one of said function definitions in said set, and which each define at least one input port and at least one output port that are functionally related according to the corresponding function definition; and a further portion which includes: a source portion identifying a data source and defining an output port through which said image data from the data source can be produced, and a destination portion identifying a data destination and defining an input port through which said image data can be supplied to the data destination;

binding information which includes binding portions that each associate a respective said input port with one of said output ports;

executing said project definition, wherein said project definition is configured to process image data corresponding to a plurality of images to adjust characteristics of said images so as to bring them into general conformity with each other; and causing the processed image data to be stored on a server that is publicly accessible via the Internet.

20. A computer-readable storage media according to claim 19, further comprising automatically transmitting a communication to a remote device through a communication link after editing said image data during execution of said project definition, wherein transmitting said communication occurs after editing a predetermined number of images.

* * * * *

UNITED STATES PATENT AND TRADEMARK OFFICE
CERTIFICATE OF CORRECTION

PATENT NO. : 8,271,576 B2
APPLICATION NO. : 12/782737
DATED : September 18, 2012
INVENTOR(S) : Simone, Jr.

Page 1 of 1

It is certified that error appears in the above-identified patent and that said Letters Patent is hereby corrected as shown below:

On Title page 2, in Item (56), under "OTHER PUBLICATIONS", in Column 2, Line 15, delete "al" and insert -- al., --, therefor.

On Title page 2, in Item (56), under "OTHER PUBLICATIONS", in Column 2, Line 19, delete "Interrnational" and insert -- International --, therefor.

On Title page 2, in Item (56), under "OTHER PUBLICATIONS", in Column 2, Line 24, delete "Interrnational" and insert -- International --, therefor.

In Fig. 9A, Drawing Sheet 4 of 10, for Tag "471", Line 1, delete "OPERATION" and insert -- OPERATING --, therefor.

In Column 1, Line 10, delete "for of" and insert -- for --, therefor.

In Column 9, Line 9, delete "TABLES 1" and insert -- TABLE 1 --, therefor.

In Column 27, Line 2, delete "mayor" and insert -- may or --, therefor.

In Column 29, Line 64, delete "later" and insert -- later. --, therefor.

Signed and Sealed this
Twenty-ninth Day of January, 2013

David J. Kappos
*Director of the United States Patent and Trademark Office*